United States Patent [19]

Aghajanian et al.

[11] Patent Number: 5,553,657

[45] Date of Patent: *Sep. 10, 1996

[54] GATING MEANS FOR METAL MATRIX COMPOSITE MANUFACTURE

[75] Inventors: Michael K. Aghajanian; Ralph A. Langensiepen; Christopher R. Kennedy; Michael A. Rocazella; Robert J. Wiener; Gregory E. Hanon; John J. Crowther, all of Newark; Allyn L. McCormick, Bear, all of Del.

[73] Assignee: Lanxide Technology Company, LP, Newark, Del.

[*] Notice: The term of this patent shall not extend beyond the expiration date of Pat. No. 5,007,474.

[21] Appl. No.: 261,694

[22] Filed: May 31, 1994

Related U.S. Application Data

[63] Continuation of Ser. No. 961,680, filed as PCT/US91/03235, May 9, 1991, abandoned, which is a continuation-in-part of Ser. No. 521,196, May 9, 1990, Pat. No. 5,119,864, which is a continuation-in-part of Ser. No. 269,315, Nov. 10, 1988, Pat. No. 5,007,474.

[51] Int. Cl.[6] .............................. B22D 19/14; B22D 19/02
[52] U.S. Cl. ............................................. 164/97; 164/98
[58] Field of Search ............................................ 164/97, 98

[56] References Cited

U.S. PATENT DOCUMENTS

| | | | |
|---|---|---|---|
| 3,547,180 | 12/1970 | Cochran | 164/97 |
| 3,981,352 | 9/1976 | Nurminen | 164/134 |
| 4,476,916 | 10/1984 | Nusbaum | 164/97 |
| 4,923,832 | 5/1990 | Newkirk | 501/98 |
| 5,007,474 | 4/1991 | Langensiepen et al. | 164/97 |
| 5,119,864 | 6/1992 | Langensiepen et al. | 164/97 |
| 5,249,621 | 10/1993 | Aghajanian et al. | 164/97 |
| 5,298,339 | 3/1994 | Aghajanian et al. | 428/614 |

FOREIGN PATENT DOCUMENTS

| | | | |
|---|---|---|---|
| 919266 | 11/1946 | France | 164/134 |
| 60-114537 | 6/1985 | Japan | 164/97 |
| 62-286661 | 12/1987 | Japan | 164/97 |
| 178958 | 7/1966 | U.S.S.R. | 164/98 |
| 2185203 | 7/1987 | United Kingdom | 164/134 |

*Primary Examiner*—Jack W. Lavinder
*Assistant Examiner*—I.-H. Lin
*Attorney, Agent, or Firm*—Jeffrey R. Ramberg

[57] ABSTRACT

The present invention relates to the use of a gating means in combination with a spontaneous infiltration process to produce a metal matrix composite body. Particularly, a permeable mass of filler material or a preform is spontaneously infiltrated by molten matrix metal to form a metal matrix composite body. A gating means is provided which controls or limits the areal contact between molten matrix metal and the filler material or preform. The use of a gating means provides for control of the amount of matrix metal which can contact the preform or filler material, which may result in less machining of a formed metal matrix composite body compared with a similar metal matrix composite body made without a gating mean. Moreover, the use of a gating means ameliorates the tendency of a formed metal matrix composite body to warp due to the contact between the formed composite body and matrix metal carcass. In a preferred embodiment, the gating means may comprise a porous material or a precursor to a porous material, which may optionally function as a separation facilitator. Alternatively, the separation facilitator may be provided independent of the gating means.

26 Claims, 5 Drawing Sheets

GATING MEANS FOR METAL MATRIX COMPOSITE MANUFACTURE

This is a continuation of application Ser. No. 07/961,680, filed as PCT/US91/03235 on May 9, 1991, and now abandoned, which is a continuation-in-part of U.S. Ser. No. 07/521,196 which issued on Jun. 9, 1992, as U.S. Pat. No. 5,119,864, which is a continuation-in-part of U.S. Ser. No. 07/269,315, which issued on Apr. 16, 1991, as U.S. Pat. No. 5,007,474.

TECHNICAL FIELD

The present invention relates to the use of a gating means in combination with various metal infiltration processes which may be utilized to produce a metal matrix composite body. Particularly, a permeable mass of filler material or a preform is infiltrated by molten matrix metal (e.g., spontaneously, by pressure infiltration, by vacuum infiltration, etc.) to form a metal matrix composite body. For example, in a preferred method for forming metal matrix composite bodies by a spontaneous infiltration process, an infiltration enhancer and/or an infiltration enhancer precursor and/or an infiltrating atmosphere are also in communication with the filler material or preform, at least at some point during the process, to permit the molten matrix metal to spontaneously infiltrate the filler material or preform. Moreover, a gating means is provided which controls or limits the areal contact between molten matrix metal and the filler material or preform. The use of a gating means provides for control of the amount of matrix metal which can contact the preform or filler material. Such limited or controlled areal contact may result in less required machining of a formed metal matrix composite body to achieve a net or near-net shape body as compared to a similar metal matrix composite body made without a gating means. Moreover, the use of a gating means ameliorates the tendency of a formed metal matrix composite body to warp due to the contact between the formed composite body and matrix metal carcass. Such warping may be the most prevalent in metal matrix composite bodies which have a high surface area relative to cross-sectional thickness.

BACKGROUND ART

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher stiffness, wear resistance and high temperature strength relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted Jul. 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75–375 kg/cm$^2$ to force molten aluminum (or molten aluminum alloy) into a fibrous or whisker mat of alumina which has been preheated to 700 to 1050° C. The maximum volume ratio of alumina to metal in the resulting solid casting was 0.25/1. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154, granted Feb. 4, 1975, to G. E. Gazza et al., also shows the use of vacuum to achieve infiltration. This patent describes loading a cold-pressed compact of AlB$_{12}$ powder onto a bed of cold-pressed aluminum powder. Additional aluminum was then positioned on top of the AlB$_{12}$ powder compact. The crucible, loaded with the AlB$_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous AlB$_{12}$ compact.

U.S. Pat. No. 3,364,976, granted Jan. 23, 1968, to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the case of a mold, the mold cavity, which is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. disclose that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform precautions should be taken so that the infiltrating metal does not displace at least portions of the particulate or preform resulting in a non-homogeneous microstructure.

Accordingly, there has been a long felt need for a simple and reliable process to produce shaped metal matrix composites which does not rely upon the use of applied pressure or vacuum (whether externally applied or internally created), or damaging wetting agents to create a metal matrix embedding another material such as a ceramic material. Moreover, there has been a long felt need to minimize the amount of final machining operations needed to produce a metal matrix composite body. The present invention satisfies these needs by providing a mechanism for infiltrating a filler material or preform with molten matrix metal (e.g., aluminum) with the use of a gating means which provides for control of the amount of matrix metal which can contact the filler material or preform, thereby resulting in less required machining of the formed metal matrix composite body to achieve a net or near-net shape body, as compared to a metal matrix composite body formed without the use of gating means.

DESCRIPTION OF COMMONLY OWNED U.S. PATENTS AND PATENTS APPLICATIONS

This application is a continuation in part application of U.S. patent application Ser. No. 07/521,196, filed May 9, 1990, which is a continuation-in-part of U.S. Pat. No. 5,007,474, which issued on Apr. 16, 1991, in the names of Ralph Alfred Langensiepen et al. and entitled "Method of Providing a Gating Means, and Products Produced Thereby".

The subject matter of this application is related to that of several co-owned Patents and several other copending and co-owned patent applications. Particularly, the patents and other copending patent applications describe novel methods for making metal matrix composite materials (hereinafter sometimes referred to as "Commonly Owned Metal Matrix Patents and Patent Applications").

A novel method of making a metal matrix composite material is disclosed in Commonly Owned U.S. Pat. No. 4,828,008, which issued on May 9, 1989, in the names of White et al., and is entitled "Metal Matrix Composites", and which published in the EPO on Nov. 17, 1988, as Publication No. 0291441. According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned U.S. Pat. No. 4,935,055, which issued on Jun. 19, 1990, from U.S. patent application Ser. No. 07/141,642, filed Jan. 7, 1988, in the names of Michael K. Aghajanian et al., and entitled "Method of Making Metal Matrix Composite with the Use of a Barrier", and which published in the EPO on Jul. 12, 1989, as Publication No. 0323945. According to the method of this Aghajanian et al. invention, a barrier means (e.g., particulate titanium diboride or a graphite material such as a flexible graphite tape product sold by Union Carbide under the trade name GRAFOIL®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008 was improved upon by Commonly Owned European Patent Application Publication No. 0333629, which published on Sep. 20, 1989. In accordance with the methods disclosed in this European Patent Application, a matrix metal alloy is present as a first source of metal and as a reservoir of matrix metal alloy which communicates with the first source of molten metal due to, for example, gravity flow. Particularly, under the conditions described in this European Patent Application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this European Patent Application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body (e.g., a macrocomposite). Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned European Patent Application Publication No. 0 375 588, which published on Jun. 27, 1990. According to this European Patent Application, spontaneous infiltration of a matrix metal into a permeable mass of filler material or preform is achieved by use of an infiltration enhancer and/or an infiltration enhancer precursor and/or an infiltrating atmosphere which are in communication with the filler material or preform, at least at some point during the process, which permits molten matrix metal to spontaneously infiltrate the filler material or preform. The application discloses a number of matrix metal/infiltration enhancer precursor/infiltrating atmosphere systems which exhibit spontaneous infiltration. Specifically, the application discloses that spontaneous infiltration behavior has been observed in the aluminum/magnesium/nitrogen system; the aluminum/strontium/nitrogen system; the aluminum/zinc/oxygen system; and the aluminum/calcium/nitrogen system. However, it is clear from the disclosure set forth in the application that the spontaneous infiltration behavior should occur in other matrix metal/infiltration enhancer precursor/infiltrating atmosphere systems.

Each of the above-discussed Commonly Owned Metal Matrix Patents and Patent Applications describes methods for the production of metal matrix composite bodies and novel metal matrix composite bodies which are produced therefrom. The entire disclosures of all of the foregoing Commonly Owned Metal Matrix Patents and Patent Applications are expressly incorporated herein by reference.

SUMMARY OF THE INVENTION

A metal matrix composite body is produced by infiltrating a permeable mass of filler material or a preform with a molten matrix metal. Infiltration of the filler material or preform may be carried out by any conventional liquid metal infiltration technique for forming metal matrix composites (e.g., pressure infiltration, vacuum infiltration, etc.) or, in a preferred embodiment, by spontaneous infiltration of a molten matrix metal into a filler material or preform in the presence of an infiltration enhancer, or any combination of these metal matrix composite formation techniques. However, prior to such infiltration, a gating means is placed between the molten matrix metal and the filler material or preform which is to be infiltrated. The gating means functions to control the areal contact between the molten matrix metal and the permeable filler material or preform. Such control can be used to deliver molten matrix metal to preferred areas of a preform or filler material; and/or may ameliorate warping of a preform or filler material by reducing contact between the preform or filler material and matrix metal carcass; and/or may improve the properties of the resultant metal matrix composite by providing a sacrificial area (i) for directional solidification to occur and (ii) where thermal expansion mismatch can be isolated; and/or may reduce or eliminate the amount of surface machining required to produce a net or near-net shape metal matrix composite.

In a preferred embodiment of the present invention, wherein a metal matrix composite is formed by spontaneous infiltration, an infiltration enhancer and/or an infiltration enhancer precursor and/or an infiltrating atmosphere are in communication with the filler material or preform, at least at some point during the process, which permits molten matrix metal to spontaneously infiltrate the filler material or preform.

In a particularly preferred embodiment of the invention, an infiltration enhancer may be supplied directly to at least one of the preform or filler material, and/or matrix metal, and/or infiltrating atmosphere. In any event, ultimately, at least during spontaneous infiltration, an infiltration enhancer should be located in at least a portion of the filler material or preform.

If a gating means is disposed between at least a portion of a molten matrix metal and a filler material or preform, an enhanced metal matrix composite body can be achieved. Suitable gating means include materials which may be permeable or impermeable to molten matrix metal under the process conditions; and/or which can facilitate the removal of a carcass of matrix metal which remains in contact with the infiltrated filler material or preform after spontaneous infiltration has been completed. An example of a suitable gating means for use with an aluminum matrix metal is a graphite material which is substantially impermeable to the matrix metal, such as a graphite tape product, which contains a single hole or a plurality of holes or passages therethrough. Another example of a suitable gating means for use with an aluminum matrix metal is a graphite ring or tube, or a plurality of graphite rings or tubes, which are also substantially impermeable to the matrix metal but which permit passage of molten matrix metal therethrough. The ring(s) or tube(s) are, typically, surrounded by a material (e.g., a particulate material), such as alumina particulate, which, under the process conditions, will not be spontaneously infiltrated by molten matrix metal. Accordingly, the combination of graphite tube(s) or ring(s) with a surrounding material which is not spontaneously infiltrated limits the areal contact between the molten matrix metal and the filler material or preform to only the passageway within the graphite ring(s) or tube(s). The number of holes or passageways, size of the holes and passageways and shape of the holes and passageways, etc., can be controlled in any suitable manner so as to achieve an enhanced metal matrix composite. Moreover, the graphite ring or tube may be of any desired cross-sectional geometry (e.g., circular, ovular, polygonal, etc.) and/or any desired vertical geometry (e.g., straight, tapered, etc.). Moreover, the graphite ring or tube can be of a sufficient length such that it can function as a riser. Specifically, a first goal of the ring or tube is for it to function as a passageway which permits communication between a source of matrix metal and a filler material or preform. However, a second goal of the riser is to function as a sacrificial area where directional solidification voids or porosity can be concentrated. Still further, a third goal of the riser is to emeliorate any thermal stresses which may be present between the matrix metal and the preform which could lead to cracking in the formed metal matrix composite body. Specifically, thermal stresses can be ameliorated by placement of at least some filler material within the riser cavity. Any thermal stresses formed can then be concentrated closer to the interface between the matrix metal and the riser rather than close to the formed metal matrix composite body and the riser. The filler material which may be located within the riser cavity may comprise a material having a composition the same as or different from the composition of the permeable mass of filler material or preform. Moreover, the filler material located within the riser cavity may vary in, for example, composition, size, volume percent, etc., from one portion of the riser cavity to another portion of the riser cavity.

Another example of a suitable impermeable gating means for an aluminum matrix metal is a gating means comprising, e.g., a colloidal graphite layer, or an aluminum oxide particulate layer which may be applied (e.g., by spraying, etc.) such that it is impermeable to infiltration by molten aluminum matrix metal, but which contains channels or passageways therethrough which permit the molten matrix metal to pass through the gating means and contact the filler material or preform. For example, the impermeable gating means may be provided on a surface of a filler material or preform by first providing a mask or pattern material to control the placement of the gating means on the surface of the filler material or preform to create, for example, a channel or hole, or a plurality of channels or holes, in the gating means. The gating means material may then be sprayed, dip-coated, silk screened, painted, etc., onto the surface of the filler material or preform to a thickness sufficient to render the gating means impermeable to molten matrix metal. Upon removal of the mask or pattern material, a gating means layer having a hole or channel, or a plurality of holes or channels, therein is present on the surface of the filler material or preform.

In a still further embodiment of the invention, a separation means, such as a relatively thin sheet of metal, which could have a composition substantially similar to or different from the composition of the matrix metal, could be positioned at a location corresponding to either opening (i.e., the opening located adjacent to the matrix metal or the opening located adjacent to the filler material or preform) of the gating means. The separation means should be capable of being at least partially permeable to the transport of molten matrix metal at a temperature which is substantially similar to the melting temperature of the matrix metal (e.g., within about ±100° C.). The separation means facilitates the spontaneous infiltration process.

In another embodiment of the present invention, a gating means which is at least partially permeable to the matrix metal may be provided. Such permeable gating means may comprise, for example, a substantially three-dimensionally interconnected porous material. Such porous material can be formed from a precursor to a porous material. Examples of suitable materials for use as permeable gating means which are at least partially permeable to an aluminum matrix metal include colloidal graphite (e.g., DAG® 154 available from Acheson Colloids) and alumina particulate (e.g., A-1000 alumina, available from Alcoa Industries Chemical Division, Bauxite, Ark.) which may be applied to the surface of a filler material or preform by, for example, spraying, dipping, silk screening, painting, etc. Without wishing to be bound by any particular theory or explanation, it is believed that the porous material may include (1) a plurality of microchannels which permit the transport of molten matrix metal through the porous material and/or (2) a reaction layer which is formed under the processing conditions (e.g., formed upon reaction of a precursor to a porous material with at least one of the matrix metal and/or filler material or preform and/or infiltration enhancer and/or infiltration enhancer precursor and/or infiltrating atmosphere) which reaction layer contains a plurality of microchannels which permit the transport of molten matrix metal through 15 the porous material, thus permitting infiltration of the filler material by the molten matrix metal to occur. Moreover, an infiltration enhancer precursor or an infiltration enhancer may be located at the interface between the matrix metal and the porous material to enhance spontaneous infiltration of the matrix metal into the filler material or preform. Moreover, it may be possible to modify the composition of the porous material upon contact with molten matrix metal as the matrix metal passes through the microchannels within the porous material. It is believed that upon solidification of the formed metal matrix composite and the carcass of matrix metal, any stresses which may exist and/or which may be created between the metal matrix composite and the carcass of matrix metal (e.g., shear stress, tensile stress, etc., due to, for example, coefficient of thermal expansion (C.T.E.) mismatch between the metal matrix composite and the carcass of matrix metal, stresses created during directional solidification of the metal matrix composite and carcass of matrix metal, etc.) may facilitate separation of the metal matrix composite from the carcass of matrix metal. Moreover, it is further believed that any reaction layer which may be formed under the process conditions may comprise a material which is weak (e.g., possess a fracture strength which is less than the fracture strength of the metal matrix composite or matrix metal carcass) relative to the metal matrix composite and/or carcass of matrix metal, thereby facilitating separation of the metal matrix composite from the carcass of matrix metal.

The thickness of the permeable gating means which is required to achieve separation of the metal matrix composite from the carcass of matrix metal may vary depending upon, for example, the amount and/or composition and/or geometry of the matrix metal and/or filler material or preform and/or gating means, etc., utilized, the reaction conditions employed (e.g., time, temperature, etc.), the method or methods used to apply the gating means to the filler material or preform, etc. For example, if the gating means layer is not present on the filler material or preform in a sufficient amount (e.g., the gating means is too thin), the gating means may remain attached to the formed metal matrix composite after infiltration has occurred. Moreover, if an excess amount of the gating means is provided to the filler material or preform (e.g., the gating means is too thick) the matrix metal may not be able to permeate the gating means, thereby inhibiting or preventing infiltration of the filler material or preform by the matrix metal. Moreover, preferential application of the permeable gating means to the surface of the filler material or preform (e.g., varying thickness, varying composition, etc.) may further enhance separation. Thus, without wishing to be bound by any particular theory or explanation, it is believed that a permeable gating means comprising a porous material (which can be made from a precursor to a porous material) may be used to control the areal contact of a molten matrix metal and a filler material or preform and to facilitate separation depending upon a number of factors including, but not limited to, the amount and/or composition and/or geometry of the matrix metal and/or filler material or preform, and/or gating means utilized, the reaction conditions employed, the method of applying and/or thickness of the gating means, the stresses present between the metal matrix composite and the carcass of matrix metal upon solidification and the presence of a reaction layer in the porous material.

It is noted that in a preferred embodiment for forming metal matrix composites by a spontaneous infiltration technique this application discusses primarily aluminum matrix metals which, at some point during the formation of the metal matrix composite body, are contacted with magnesium, which functions as the infiltration enhancer precursor, in the presence of nitrogen, which functions as the infiltrating atmosphere. Thus, the matrix metal/infiltration enhancer precursor/infiltrating atmosphere system of aluminum/magnesium/nitrogen exhibits spontaneous infiltration. A suitable gating means for use with this system comprises a graphite material, such as a graphite tape product sold by Union Carbide under the trademark GRAFOIL®. However, other matrix metal/infiltration enhancer precursor/infiltrating atmosphere systems may also behave in a manner similar to the system aluminum/magnesium/nitrogen. For example, similar spontaneous infiltration behavior has been observed in the aluminum/strontium/nitrogen system; the aluminum/zinc/oxygen system; and the aluminum/calcium/nitrogen system. Accordingly, even though the aluminum/magnesium/nitrogen system is discussed primarily herein, it should be understood that other matrix metal/infiltration enhancer precursor/infiltrating atmosphere systems may behave in a similar manner and are intended to be encompassed by the invention. A suitable gating means can be chosen for use with each of the other spontaneous infiltration systems.

When the matrix metal comprises an aluminum alloy, the aluminum alloy is contacted in a controlled manner with a preform comprising a filler material (e.g., alumina or silicon carbide) or a mass of filler material, said mass of filler material or preform having admixed therewith, and/or at some point during the process being exposed to, magnesium. Moreover, in a preferred embodiment, the aluminum alloy and/or preform or filler material are contained in a nitrogen atmosphere for at least a portion of the process. The preform will be spontaneously infiltrated and the extent or rate of spontaneous infiltration and formation of metal matrix will vary with a given set of process conditions including, for example, the concentration of magnesium provided to the system (e.g., in the aluminum alloy and/or in the filler material or preform and/or in the infiltrating atmosphere), the size and/or composition of the particles in the preform or filler material, the concentration of nitrogen in the infiltrating atmosphere, the time permitted for infiltration, and/or the temperature at which infiltration occurs. Spontaneous infiltration typically occurs to an extent sufficient to embed substantially completely the preform or filler material.

DEFINITIONS

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein, means any suitable means which interferes with, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" include materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Filler", as used herein, is intended to include either single constituents or mixtures of constituents which are substantially nonreactive with and/or of limited solubility in the matrix metal and may be single or multi-phase. Fillers may be provided in a wide variety of forms, such as powders, flakes, platelets, microspheres, whiskers, bubbles, fibers, particulates, fiber mats, chopped fibers, spheres, pellets, tubules, refractory cloths, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum matrix metal. Fillers may also include metals.

"Gating Means", as used herein, means any material or combination of materials which under the process conditions exhibits one or more of the following characteristics: (1) is permeable or substantially impermeable to molten matrix metal relative to the filler material or preform to be infiltrated; (2) reduces the strength of the bond and/or the amount of bonding between matrix metal carcass and the infiltrated metal matrix composite body, thereby (i) ameliorating the amount of stress (e.g., warpage) transferred to the metal matrix composite body by the matrix metal carcass due to differential cooling shrinkage between the carcass of matrix metal and the resultant metal matrix composite body; and/or (ii) reducing the amount of machining required on a surface of a resultant metal matrix composite body due to lessened areal contact between the carcass of matrix metal and the resultant metal matrix composite body and/or due to lessened areal contact between matrix metal and the preform or filler material which is to be infiltrated, while infiltration is occurring.

"Infiltrating Atmosphere", as used herein, means that atmosphere which is present which interacts with the matrix metal and/or preform (or filler material) and/or infiltration enhancer precursor and/or infiltration enhancer which permits or enhances spontaneous infiltration of the matrix metal.

"Infiltration Enhancer", as used herein, means a material which promotes or assists in the spontaneous infiltration of a matrix metal into a filler material or preform. An infiltration enhancer may be formed from, for example, (1) a reaction of an infiltration enhancer precursor with an infiltrating atmosphere to form a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed from a reaction between an infiltration enhancer precursor and another species. Ultimately, at least during the spontaneous infiltration, the infiltration enhancer should be located in at least a portion of the filler material or preform to achieve spontaneous infiltration, and the infiltration enhancer may be at least partially reducible by the matrix metal.

"Infiltration Enhancer Precursor" or "Precursor to the Infiltration Enhancer", as used herein, means a material which when used in combination with (1) the matrix metal, (2) the preform or filler material and/or (3) an infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Matrix Metal" or "Matrix Metal Alloy", as used herein, means that metal which is utilized to form a metal matrix composite body (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibit spontaneous metal infiltration into a preform or filler material. It should be understood that whenever a "/" appears between an exemplary matrix metal, infiltration enhancer precursor and infiltrating atmosphere that the "/" is used to designate a system or combination of materials which, when combined in a particular manner, exhibits spontaneous infiltration into a preform or filler material.

"Metal Matrix Composite" or "MMC" as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Nonreactive Vessel for Housing Matrix Metal" means any vessel which can house or contain molten matrix metal and/or filler material (or preform) under the process conditions and not react with the matrix and/or the infiltrating atmosphere and/or infiltration enhancer precursor and/or filler material (or preform) in a manner which would be significantly detrimental to the spontaneous infiltration mechanism.

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform. The reservoir may also supply at least some metal which is different from the matrix metal.

"Riser", as used herein, means both a component of a gating means and a gating means per se, which enhances the separation between a metal matrix composite body and residual matrix metal. The riser is substantially impermeable to the molten matrix metal and contains at least one passageway therein which permits the transport of molten matrix metal through the riser material. The riser may comprise, for example, a ring or tube, or any other cylindrical configuration or other configuration which allows transport of molten matrix metal therethrough.

"Separation Means" or "Separation Facilitator," as used herein, means a material such as a metal, or a reducible oxide, nitride, etc., which is provided to at least a portion of an interface between, for example, the matrix metal and the gating means or between the gating means and the formed metal matrix composite, to enhance formation of a metal matrix composite body by assisting in the separation of the formed body from the residual carcass of matrix metal.

"Spontaneous Infiltration", as used herein, means the infiltration of matrix metal into the permeable mass of filler or preform occurs without requirement for the application of pressure or vacuum (whether externally applied or internally created).

BRIEF DESCRIPTION OF DRAWING

The following figures are provided to assist in understanding the invention, but are not intended to limit the scope of the invention. Similar reference numerals have been used wherever possible in each of the Figures to denote like components, wherein.

DETAILED DESCRIPTION OF THE INVENTION AND PREFERRED EMBODIMENT

Figure 1:
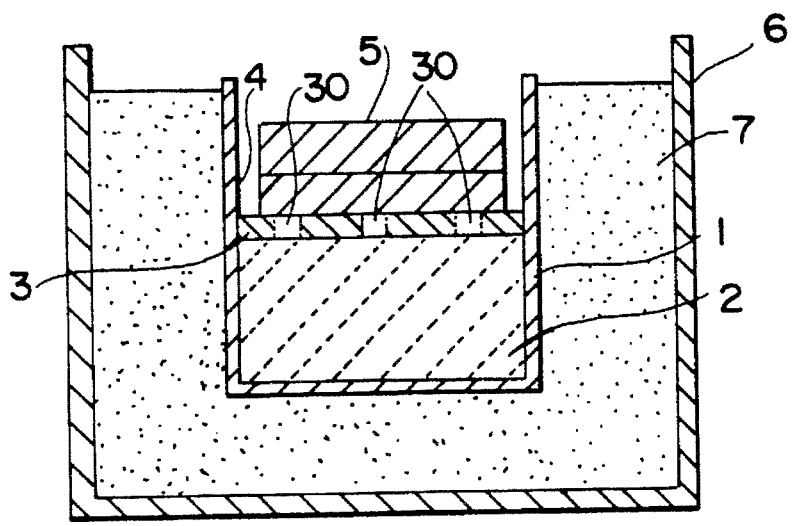
FIG. 1 is a schematic cross section of an assemblage of materials utilized to form a metal matrix composite body in accordance with Example 1.

The present invention relates to a method for forming metal matrix composites by the use of a gating means to control or regulate the infiltration of molten matrix metal into a filler material or preform. Infiltration of the filler material or preform may be carried out by any conventional liquid metal infiltration technique for forming metal matrix composites (e.g., pressure infiltration, vacuum infiltration, etc.) or, in a preferred embodiment, by spontaneous infiltration of a molten matrix metal into a filler material or preform in the presence of an infiltration enhancer, or any combination of these metal matrix composite formation techniques. Specifically, in the preferred embodiment for forming metal matrix composites by spontaneous infiltration a molten matrix metal is caused or induced to infiltrate a filler material or a preform after passing through a gating means. The gating means comprises any material which can be placed between molten matrix metal and a permeable filler material or preform and which can cause the molten matrix metal to, preferentially, infiltrate the filler material or preform through at least one passageway defined in the gating means. Thus, the gating means functions to control the areal contact between the molten matrix metal and the permeable filler material or preform.

Such control can be used to deliver molten matrix metal to preferred areas of a preform or filler material; and/or may ameliorate warping of a preform or filler material by reducing contact between the preform or filler material and matrix metal carcass; and/or may improve the properties of the resultant metal matrix composite by providing a sacrificial area (i) for directional solidification to occur and (ii) where thermal expansion mismatch can be isolated; and/or may reduce or eliminate the amount of surface machining required to produce a net or near-net shape metal matrix composite. Suitable gating means include materials which typically are impermeable or permeable to molten matrix metal under the process conditions; and/or which can facilitate the removal of a carcass of matrix metal which remains in contact with the infiltrated filler material or preform after spontaneous infiltration has been completed.

The passageway(s) provided in the gating means (discussed in greater detail later herein), can be of any suitable number or configuration. For example, the gating means may provide a single passageway, a plurality of passageways spaced evenly or randomly apart, or a plurality of passageways spaced preferentially to enhance formation of a desired metal matrix composite configuration. The gating means should be capable of (1) absorbing any cooling stresses which exist between the carcass of matrix metal and the formed metal matrix composite and/or (2) reducing the strength of the bond and/or reducing the amount of bonding between the matrix metal carcass and the formed metal matrix composite. Further, by appropriately locating the passageway(s) in the gating means, the gating means can be utilized to compensate for any uneven infiltration of matrix metal into the filler material or preform. After proper selection, design and placement of the gating means, the permeable preform or filler material can be infiltrated by molten matrix metal.

In a preferred embodiment of the present invention, wherein a metal matrix composite is formed by spontaneous infiltration, an infiltration enhancer and/or an infiltration enhancer precursor and/or an infiltrating atmosphere are in communication with the filler material or preform, at least at some point during the process, which permits molten matrix metal to spontaneously infiltrate the filler material or preform.

In a particularly preferred embodiment of the invention, an infiltration enhancer may be supplied directly to at least one of the preform or filler material, and/or matrix metal, and/or infiltrating atmosphere. In any event, ultimately, at least during spontaneous infiltration, an infiltration enhancer should be located in at least a portion of the filler material or preform.

A gating means for use in the present invention may comprise a layer of material, e.g., a graphite material or an aluminum oxide material, which is essentially impermeable (i.e., under the processing conditions molten matrix will not infiltrate the layer of material) by the molten matrix metal, or which is at least partially permeable, and which contains at least one passageway therethrough which allows molten matrix metal to preferentially, infiltrate the filler material or preform. The gating means may be in the form of, for example, a sheet, a particulate layer, a slurry or paste, or a coating which may be applied to the filler material or preform by, for example, spraying, dipping, silk screening, painting, etc., or any other form or combination of forms which regulates or controls the location(s) where infiltration of molten matrix metal into a filler material or preform can occur. An example of a suitable gating means for use with an aluminum matrix metal is a graphite material which is substantially impermeable to the matrix metal, such as a graphite tape product which contains a single hole or a plurality of holes or passages therethrough. In a particularly preferred embodiment, the gating means comprises a graphite tape product sold under the trademark GRAFOIL®, registered to Union Carbide, having therein at least one passageway which permits the transport of molten matrix metal preferentially therethrough. Upon infiltration of the filler material or preform by the molten matrix metal, the formed metal matrix composite is attached to the residual matrix metal only at the passageway(s) within the gating means. The separation of the formed metal matrix composite body from the residual matrix metal is facilitated, thereby minimizing the need for time-consuming and/or expensive machining of the metal matrix composite body to remove excess matrix metal.

In a further preferred embodiment of the present invention, the gating means may include a material or a combination of materials which enhance the separation between a formed metal matrix composite body and residual matrix metal. For example, the gating means may comprise at least one riser, e.g., a ring or a tube of material which is substantially impermeable to by the molten matrix metal under the processing conditions and which provides at least one passageway between the molten matrix metal and the filler material or preform. An example of a suitable gating means for use with an aluminum matrix metal is a graphite ring or tube, or a plurality of rings or tubes, which are substantially impermeable to the matrix metal but which permit passage of molten matrix metal therethrough. The gating means is located between a filler material or preform and a source of molten matrix metal by positioning at least one riser such that it provides a passageway between the filler material or preform and the source of molten matrix metal. Steps must be taken to assure that matrix metal is not permitted to flow into any remaining space between the preform or filler material and the source of matrix metal. For example, the remaining space could be filled with a powder or particulate material, such as an alumina particulate, which is substantially non-wettable by the molten matrix metal under the process conditions. Alternatively, the contact area between the preform or filler material and the gating means could be appropriately sealed to prevent molten matrix metal from contacting the preform or filler material at any location other than the gating means. Thus, under the processing conditions, molten matrix metal preferentially, spontaneously infiltrates the filler material or preform through the passageway(s) established by the riser(s) in the gating means. The number of holes or passageways, size of the holes and passageways and shape of the holes and passageways, etc., can be controlled in any suitable manner so as to achieve an enhanced metal matrix composite. Moreover, when using a graphite ring or tube, the graphite ring or tube may be of any desired cross-sectional geometry (e.g., circular, ovular, polygonal, etc.) and/or any desired vertical geometry (e.g., straight, tapered, etc.). Moreover, the graphite ring or tube can be of a sufficient length such that it can function as a riser. Specifically, a first goal of the ring or tube is for it to function as a passageway which permits communication between a source of matrix metal and a filler material or preform.

In a particularly preferred embodiment, the gating means may comprise at least one riser, comprising, for example, a graphite ring or tube, which spatially separates the source of matrix metal and the preform or filler material. A particulate material comprising, for example, an alumina particulate material which is non-wettable by the molten matrix metal under the processing conditions, is then placed into the open space which exists between the source of matrix metal and the preform or filler material, thereby substantially completely surrounding the riser. Upon infiltration of the filler material or preform by the molten matrix metal, the uninfiltrated powder or particulate material of the gating means, typically, is readily removed by only minimal mechanical agitation (e.g., pouring it out), thus leaving the riser portion(s) of the gating means as the only point(s) of attachment between the metal matrix composite and the residual matrix metal. Thus, after infiltration is completed, the riser portion may be readily removed with minimal machining (e.g., cutting or sectioning the riser with a saw, etc.).

To improve further the mechanical and/or physical properties of metal matrix composite bodies, directional solidification of the formed metal matrix composite body can be effected. For example, by utilizing the directional solidification techniques discussed in commonly owned European Patent Application Publication No. 0 368 785, which published May 16, 1990, shrinkage voids can be substantially eliminated. For example, by placing a formed metal matrix composite body produced by the method of the present invention onto a chill plate (e.g., a water-cooled aluminum quench plate), solidification porosity and/or flaws within the composite body may be reduced or substantially eliminated. Moreover, a hot topping material may be provided on the top of the residual matrix metal to enhance directional solidification of the formed metal matrix composite body, thus further reducing or eliminating solidification defects in the composite body.

A second goal of the riser is to provide a sacrificial area where directional solidification voids or porosity can be concentrated. The residual matrix metal within the riser of the gating means can be used as a sacrificial section to further improve the properties of the formed metal matrix composite body. Specifically, after infiltration has occurred, directional solidification of the formed metal matrix composite body can be effected and any solidification porosity which typically forms can be substantially eliminated from the composite body by causing such porosity to be substantially completely concentrated in the riser of the gating means and/or in the carcass of matrix metal. The riser containing residual matrix metal may then be easily removed from the formed metal matrix composite body.

The riser can also be constructed to ameliorate other flaws which may exist or be created in the metal matrix composite body, which is a third goal of the riser. For example, the coefficient of thermal expansion (CTE) of the formed metal matrix composite body (i.e., matrix metal plus filler) may differ from the CTE of the residual matrix metal (i.e., matrix metal only). Thus, by utilizing the riser to physically separate the matrix metal from the formed metal matrix composite body, cracks which may form in the composite body during heat-up and/or cool-down may be substantially reduced or eliminated. Moreover, the use of a riser alone may not completely ameliorate all flaws or cracks in the formed metal matrix composite body. Accordingly, it may be necessary to utilize a filler material within the riser of the gating means prior to infiltrating the filler material or preform with molten matrix metal. The use of a filler material in the riser effectively moves the point of CTE mismatch away from the surface of the metal matrix composite body and into the sacrificial metal matrix portion (i.e., that portion of the riser having filler material infiltrated by matrix metal) within the riser. The sacrificial metal matrix within the riser can then be removed (e.g., by machining) from the formed metal matrix composite body without the occurrence of any flaws in the formed composite body. Moreover, depending on the desired result, the filler material provided within the sacrificial portion may be the same or different in size and/or shape and/or filler loading and/or composition than the filler in the formed metal matrix composite body. For example, by providing a filler material within the sacrificial portion which is larger in size than the filler in the formed metal matrix composite body, the flow of matrix metal into the filler material or preform during infiltration will not be substantially reduced.

Another example of a suitable impermeable gating means for an aluminum matrix metal is a gating means comprising, e.g., a colloidal graphite layer, or an aluminum oxide particulate layer which may be applied (e.g., by spraying, etc.) such that it is impermeable to infiltration by molten aluminum matrix metal, but which contains channels or passageways therethrough which permit the molten matrix metal to pass through the gating means and contact the filler material or preform. For example, the impermeable gating means may be provided on a surface of a filler material or preform by first providing a mask or pattern material to control the placement of the gating means on the surface of the filler material or preform to create, for example, a channel or hole, or a plurality of channels or holes, in the gating means. The gating means material may then be sprayed, dip-coated, silk screened, painted, etc., onto the surface of the filler material or preform to a thickness sufficient to render the gating means impermeable to molten matrix metal. Upon removal of the mask or pattern material, a gating means layer having a hole or channel, or a plurality of holes or channels, therein is present on the surface of the filler material or preform.

In a further embodiment of the present invention, a separation means, e.g., a metal foil or a reducible oxide, nitride, etc., may be provided to at least a portion of an interface between, for example, the matrix metal and the gating means or the gating means and the formed metal matrix composite, to enhance formation of a metal matrix composite body by the method of the present invention. The separation means may be utilized to facilitate separation of the formed body and the residual matrix metal by reacting with, for example, the matrix metal and/or the infiltrating atmosphere, to form a reaction product (e.g., an intermetallic, a nitride, etc.) which may exhibit, for example, brittleness or CTE mismatch. For example, for an aluminum matrix metal, a suitable separation means comprises an aluminum metal foil which, upon contact with an infiltrating atmosphere of nitrogen, forms aluminum nitride which is more brittle than the matrix metal, thus facilitating separation of, for example, the metal matrix composite from the matrix metal. The composition of the separation means may be substantially the same as or different from the composition of the matrix metal, and the separation means may be solid or perforated. Moreover, the separation means does not substantially interfere with the transport of molten matrix metal into the filler material or preform. For example, the separation means, typically, is not impermeable to the flow of molten matrix metal. Further, it is believed that the separation means may enhance the formation of metal matrix composite bodies by preventing infiltration enhancer precursor and/or infiltration enhancer, upon vaporization, when vaporization is utilized, from escaping from the reaction system, thus facilitating the coating of filler material with infiltration enhancer.

In another embodiment of the present invention, a gating means which is at least partially permeable to the matrix metal may be provided. Such permeable gating means may comprise, for example, a substantially three-dimensionally interconnected porous material. Such porous material can be formed from a precursor to a porous material. Examples of suitable materials for use as permeable gating means which are at least partially permeable to an aluminum matrix metal include colloidal graphite (e.g., DAG® 154 available from Acheson Colloids) and alumina particulate (e.g., A-1000 alumina, available from Alcoa Industries Chemical Division, Bauxite, Ark.) which may be applied to the surface of a filler material or preform by, for example, spraying, dipping, silk screening, painting, etc. Without wishing to be bound by any particular theory or explanation, it is believed that the porous material may include (1) a plurality of microchannels which permit the transport of molten matrix metal through the porous material and/or (2) a reaction layer which is formed under the processing conditions (e.g., formed upon reaction of a precursor to a porous material with at least one of the matrix metal and/or filler material or preform and/or infiltration enhancer and/or infiltration enhancer precursor and/or infiltrating atmosphere) which reaction layer contains a plurality of microchannels which permit the transport of molten matrix metal through the porous material, thus permitting infiltration of the filler material by the molten matrix metal to occur. Moreover, an infiltration enhancer precursor or an infiltration enhancer may be located at the interface between the matrix metal and the porous material to enhance spontaneous infiltration of the matrix metal into the filler material or preform. Moreover, it may be possible to modify the composition of the porous layer upon contact with molten matrix metal as matrix metal passes through the microchannels within the porous material. It is believed that upon solidification of the formed metal matrix composite and the carcass of matrix metal, any stresses which may exist and/or which may be created between the metal matrix composite and the carcass of matrix metal (e.g., shear stress, tensile stress, etc., due to, for example, coefficient of thermal expansion (C.T.E.) mismatch between the metal matrix composite and the carcass of matrix metal, stresses created during directional solidification of the metal matrix composite and carcass of matrix metal, etc.) may facilitate separation of the metal matrix composite from the carcass of matrix metal. Moreover, it is further believed that any reaction layer which may be formed under the process conditions may comprise a material which is weak (e.g., possess a fracture strength which is less than the fracture strength of the metal matrix composite or matrix metal carcass) relative to the metal matrix composite and/or carcass of matrix metal, thereby facilitating separation of the metal matrix composite from the carcass of matrix metal.

The thickness of the permeable gating means which is required to achieve separation of the metal matrix composite from the carcass of matrix metal may vary depending upon, for example, the amount and/or composition and/or geometry of the matrix metal and/or filler material or preform and/or gating means, etc., utilized, the reaction conditions employed (e.g., time, temperature, etc.), the method or methods used to apply the gating means to the filler material or preform, etc. For example, if the gating means layer is not present on the filler material or preform in a sufficient amount (e.g., the gating means is too thin), the gating means may remain attached to the formed metal matrix composite after infiltration has occurred. Moreover, if an excess amount of the gating means is provided to the filler material or preform (e.g., the gating means is too thick) the matrix metal may not be able to permeate the gating means, thereby inhibiting or preventing infiltration of the filler material or preform by the matrix metal. Moreover, preferential application of the permeable gating means to the surface of the filler material or preform (e.g., varying thickness, varying composition, etc.) may further enhance separation. Thus, without wishing to be bound by any particular theory or explanation, it is believed that a permeable gating means comprising a porous material (which can be made from a precursor to a porous material) may be used to control the areal contact of a molten matrix metal and a filler material or preform and to facilitate separation depending upon a number of factors including, but not limited to, the amount and/or composition and/or geometry of the matrix metal and/or filler material or preform, and/or gating means utilized, the reaction conditions employed, the method of applying and/or thickness of the gating means, the stresses present between the metal matrix composite and the carcass of matrix metal upon solidification and the presence of a reaction layer in the porous material.

Depending on the desired geometry of the formed metal matrix composite body and any final machining capabilities, the gating means may be provided in any number of desired configurations. For example, a gating means may be provided on the top or bottom of the filler material or preform, or at the sides of the filler material or preform, or any combination thereof. Moreover, the preform or filler material may be configured so as to enhance the formation of a metal matrix composite body by the use of a gating means. For example, a portion of a preform or filler material which contacts the gating means may be configured so as to become sacrificial and easily removed from the final metal matrix composite body.

In a preferred embodiment, filler material or preform is configured such that a sacrificial section extends beyond the geometry of the final composite body to be manufactured. For example, a projection or tab which is, e.g., rectangular, in shape and which may extend from only a small portion or, optionally, the entire length or width of a surface of the preform or filler material, may be provided as the contact surface for the gating means in the method of the present invention. The tab portion may contain a filler material which is of a composition and/or size which is identical to, similar to or different from, the filler material in the remaining portion of the preform or filler material. After infiltration of the preform or filler material by molten matrix metal, the tab may be easily machined off of the final composite body, thus facilitating production of flaw-free, near net-shape metal matrix composite bodies. Moreover, when infiltrating a loose mass of filler material, by providing a sacrificial tab section in the mold or retaining bed for contact with the gating means, the surface of the loose mass of filler material may be controlled (e.g., weighted using a weighting means) to retain the loose mass in a substantially uniform configuration, thus minimizing shifting of the loose filler upon infiltration.

To achieve infiltration of a filler material or preform by the preferred spontaneous infiltration technique, an infiltration enhancer and/or infiltration enhancer precursor and/or infiltrating atmosphere are in communication with the filler material or preform, at least at some point during the process, which permits molten matrix metal to spontaneously infiltrate the filler material or preform through the gating means. Specifically, in order to effect spontaneous infiltration of the matrix metal into the filler material or preform, an infiltration enhancer should be provided to the spontaneous system. An infiltration enhancer could be formed from an infiltration enhancer precursor which could be provided (1) in the matrix metal; and/or (2) in the filler material or preform; and/or (3) from the infiltrating atmosphere and/or (4) from an external source into the spontaneous system. Moreover, rather than supplying an infiltration enhancer precursor, an infiltration enhancer may be supplied directly to at least one of the filler material or preform, and/or matrix metal, and/or infiltrating atmosphere. Ultimately, at least during the spontaneous infiltration, the infiltration enhancer should be located in at least a portion of the filler material or preform.

In a further preferred embodiment for forming metal matrix composites by spontaneous infiltration it is possible that the infiltration enhancer precursor can be at least partially reacted with the infiltrating atmosphere such that infiltration enhancer can be formed in at least a portion of the filler material or preform prior to or substantially simultaneously with contacting the preform or filler material with molten matrix metal (e.g., if magnesium was the infiltration enhancer precursor and nitrogen was the infiltrating atmosphere, the infiltration enhancer could be magnesium nitride which would be located in at least a portion of the filler material or preform).

An example of a matrix metal/infiltration enhancer precursor/infiltrating atmosphere system is the aluminum/magnesium/nitrogen system. Specifically, an aluminum matrix metal can be embedded within a filler material which can be contained within a suitable refractory vessel which, under the process conditions, does not react with the aluminum matrix metal and/or the filler material when the aluminum is made molten. A filler material containing or being exposed to magnesium, and being exposed to, at least at some point during the processing, a nitrogen atmosphere, can be contacted with the molten aluminum matrix metal. The matrix metal will then spontaneously infiltrate the filler material or preform.

Moreover, rather than supplying an infiltration enhancer precursor, an infiltration enhancer may be supplied directly to at least one of the preform, and/or matrix metal, and/or infiltrating atmosphere. Ultimately, at least during the spontaneous infiltration, the infiltration enhancer should be located in at least a portion of the filler material or preform.

Under the conditions employed in the method of the present invention, in the case of an aluminum/magnesium/nitrogen spontaneous infiltration system, the filler material or preform should be sufficiently permeable to permit the nitrogen-containing gas to penetrate or permeate the filler material or preform at some point during the process and/or contact the molten matrix metal. Moreover, the permeable filler material or preform can accommodate infiltration of the molten matrix metal, thereby causing the nitrogen-permeated filler material or preform to be infiltrated spontaneously with molten matrix metal to form a metal matrix composite body and/or cause the nitrogen to react with an infiltration enhancer precursor to form infiltration enhancer in the filler material or preform and thereby resulting in spontaneous infiltration. The extent or rate of spontaneous infiltration and formation of the metal matrix composite will vary with a given set of process conditions, including magnesium content of the aluminum alloy, magnesium content of the filler material or preform, amount of magnesium nitride in the filler material or preform, the presence of additional alloying elements (e.g., silicon, iron, copper, manganese, chromium, zinc, and the like), average size of the filler material (e.g., particle diameter), surface condition and type of filler material, nitrogen concentration of the infiltrating atmosphere, time permitted for infiltration and temperature at which infiltration occurs. For example, for infiltration of the molten aluminum matrix metal to occur spontaneously, the aluminum can be alloyed with at least about 1% by weight, and preferably at least about 3% by weight, magnesium (which functions as the infiltration enhancer precursor), based on alloy weight. Auxiliary alloying elements, as discussed above, may also be included in the matrix metal to tailor specific properties thereof. Additionally, the auxiliary alloying elements may affect the minimum amount of magnesium required in the matrix aluminum metal to result in spontaneous infiltration of the filler material or preform. Loss of magnesium from the spontaneous system due to, for example, volatilization should not occur to such an extent that no magnesium was present to form infiltration enhancer. Thus, it is desirable to utilize a sufficient amount of initial alloying elements to assure that spontaneous infiltration will not be adversely affected by volatilization. Still further, the presence of magnesium in both of the filler material or preform and matrix metal or the filler material or preform alone may result in a reduction in the required amount of magnesium to achieve spontaneous infiltration (discussed in greater detail later herein).

The volume percent of nitrogen in the nitrogen atmosphere also affects formation rates of the metal matrix composite body. Specifically, if less than about 10 volume percent of nitrogen is present in the atmosphere, very slow or little spontaneous infiltration will occur. It has been discovered that it is preferable for at least about 50 volume percent of nitrogen to be present in the infiltrating atmosphere, thereby resulting in, for example, shorter infiltration times due to a much more rapid rate of infiltration. The infiltrating atmosphere (e.g., a nitrogen-containing gas) can be supplied directly to the filler material or preform and/or matrix metal, or it may be produced or result from a decomposition of a material.

The minimum magnesium content required for molten matrix metal to infiltrate a filler material or preform depends on one or more variables such as the processing temperature, time, the presence of auxiliary alloying elements such as silicon or zinc, the nature of the filler material, the location of the magnesium in one or more components of the spontaneous system, the nitrogen content of the atmosphere, and the rate at which the nitrogen atmosphere flows. Lower temperatures or shorter heating times can be used to obtain complete infiltration as the magnesium content of the alloy and/or preform is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the filler material or preform, alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration. The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000° C. into a bedding of 500 mesh, 39 CRYSTOLON® (99 percent pure silicon carbide from Norton Co.). However, in the presence of magnesium, silicon has been found to promote the infiltration process. As a further example, the amount of magnesium varies if it is supplied exclusively to the preform or filler material. It has been discovered that spontaneous infiltration will occur with a lesser weight percent of magnesium supplied to the spontaneous system when at least some of the total amount of magnesium supplied is placed in the preform or filler material. It may be desirable for a lesser amount of magnesium to be provided in order to prevent the formation of undesirable intermetallics in the metal matrix composite body. In the case of a silicon carbide preform, it has been discovered that when the preform is contacted with an aluminum matrix metal, the preform containing at least about 1% by weight magnesium and being in the presence of a substantially pure nitrogen atmosphere, the matrix metal spontaneously infiltrates the preform. In the case of an alumina preform, the amount of magnesium required to achieve acceptable spontaneous infiltration is slightly higher. Specifically, it has been found that when an alumina preform, when contacted with a similar aluminum matrix metal, at about the same temperature as the aluminum that infiltrated into the silicon carbide preform, and in the presence of the same pure nitrogen atmosphere, at least about 3% by weight magnesium may be required to achieve similar spontaneous infiltration to that achieved in the silicon carbide preform discussed immediately above.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the supplied infiltration enhancer or infiltration enhancer precursor to be alloyed with the matrix metal, but rather, simply supplied to the spontaneous system). If the magnesium was applied to a surface of the matrix metal it may be preferred that said surface should be the surface which is closest to, or preferably in contact with, the permeable mass of filler material or vice versa; or such magnesium could be mixed into at least a portion of the preform or filler material. Still further, it is possible that some combination of surface application, alloying and placement of magnesium into at least a portion of the filler material could be used. Such combination of applying infiltration enhancer(s) and/or infiltration enhancer precursor(s) could result in a decrease in the total weight percent of magnesium needed to promote infiltration of the matrix aluminum metal into the filler material, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler or preform material, also tends to affect the extent of infiltration at a given temperature. Consequently, in some cases where little or no magnesium is contacted directly with the preform or filler material, it may be preferred that at least about three weight percent magnesium be included in the alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g. to at least about 5 weight percent; and/or (2) when alloying constituents are mixed with the permeable mass of filler material or preform; and/or (3) when another element such as zinc or iron is present in the aluminum alloy. The temperature also may vary with different filler materials. In general, spontaneous and progressive infiltration will occur at a process temperature of at least about 675° C., and preferably a process temperature of at least about 750° C.–800° C. Temperatures generally in excess of 1200° C. do not appear to benefit the process, and a particularly useful temperature range has been found to be from about 675° C. to about 1200° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable, dependent upon the intended application of the metal matrix composite body. Typically, electric resistance heating is utilized to achieve the infiltration temperature. However, any heating means which can cause the matrix metal to become molten and does not adversely affect spontaneous infiltration is acceptable for use with the invention.

In the present method, for example, a permeable filler material or preform comes into contact with molten aluminum in the presence of, at least sometime during the process, a nitrogen-containing gas. The nitrogen-containing gas may be supplied by maintaining a continuous flow of gas into contact with at least one of the filler material or the preform and/or molten aluminum matrix metal. Although the flow rate of the nitrogen-containing gas is not critical, it is preferred that the flow rate be sufficient to compensate for any nitrogen lost from the atmosphere due to nitride formation in the alloy matrix, and also to prevent or inhibit the incursion of air which can have an oxidizing effection the molten metal.

The methods of forming metal matrix composites in the present invention are applicable to a wide variety of filler materials, and the choice of filler materials will depend on such factors as the matrix alloy, the process conditions, the reactivity of the molten matrix alloy with the filler material, the ability of the filler material to conform to the matrix metal, and the properties sought for the final composite product. For example, when aluminum is the matrix metal, suitable filler materials include (a) oxides, e.g. alumina; (b) carbides, e.g. silicon carbide; (c) borides, e.g. aluminum dodecaboride, and (d) nitrides, e.g. aluminum nitride and mixtures thereof. If there is a tendency for the filler material to react with the molten aluminum matrix metal, this might be accommodated by minimizing the infiltration time and temperature or by providing a non-reactive coating on the filler. The filler material may comprise a substrate, such as carbon or other non-ceramic material, bearing a coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the form of a woven mat and a continuous filament, such as multifilament tows. Further, the filler material may be homogeneous or heterogeneous.

Certain filler materials exhibit enhanced infiltration relative to filler materials having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in Commonly Owned U.S. Pat. No. 4,851,375 entitled "Methods of Making Composite Ceramic Articles Having Embedded Filler", which issued Jul. 25, 1989, in the names of Marc S. Newkirk et al., also exhibit desirable infiltration properties relative to commercially available alumina products. The subject matter of each of the issued patents is herein expressly incorporated by reference. Specifically, it has been discovered that complete infiltration of a permeable mass of a ceramic or ceramic composite material can occur at lower infiltration temperatures and/or lower infiltration times by utilizing a crushed or comminuted body produced by the method of the aforementioned U.S. Patents.

The size and shape of the filler material can be any that may be required to achieve the properties desired in the composite and which can conform to the matrix metal. Thus, the filler material may be in the form of particles, whiskers, platelets, fibers or mixtures since infiltration is not restricted by the shape of the filler material. Other shapes such as spheres, tubules, pellets, refractory fiber cloth, and the like may be employed. In addition, the size of the material does not limit infiltration, although a higher temperature or longer time period may be needed for complete infiltration of a mass of smaller particles than for larger particles. Further, the mass of filler material (shaped into a preform) to be infiltrated should be permeable, i.e., permeable to molten matrix metal and to the infiltrating atmosphere.

The method of forming metal matrix composites according to the present invention, not being dependent on the use of pressure to force or displace molten matrix metal into a preform or a mass of filler material, permits the production of substantially uniform metal matrix composites having a high volume fraction of filler material and low porosity. Higher volume fractions of filler material on the order of at least about 50% may be achieved by using a lower porosity initial mass of filler material and mixtures of particle sizes and by admixing particles of varying size. Higher volume fractions also may be achieved if the mass of filler is compacted or otherwise densified provided that the mass is not converted into either a compact with close cell porosity or into a fully dense structure that would prevent infiltration by the molten alloy.

It has been observed that for aluminum infiltration and matrix formation around a ceramic filler, wetting of the ceramic filler by the aluminum matrix metal may be an important part of the infiltration mechanism. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler material, the filler material to be infiltrated, and the nitrogen concentration of the infiltrating atmosphere. For example, the extent of aluminum nitride formation at a given process temperature is believed to increase as the ability of the alloy to wet the filler decreases and as the nitrogen concentration of the atmosphere increases.

It is therefore possible to tailor the constituency of the metal matrix during formation of the composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the ceramic material used. In the case of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Moreover, it is possible to use a reservoir of matrix metal to assure complete infiltration of the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal so long as an adequate amount of time is given for the mixing to occur. Thus, by using a reservoir metal which is different in composition than the first source of matrix metal, it is possible to tailor the properties of the metal matrix to meet various operating requirements and thus tailor the properties of the metal matrix composite.

A barrier means may also be utilized in combination with the present invention. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process as well as being capable of locally inhibiting, stopping, interfering with, preventing, or the like, continued infiltration or any other kind of movement beyond the defined surface boundary of the filler material.

Suitable barrier means includes materials which are substantially non-wettable by the migrating molten matrix alloy under the process conditions employed. A barrier of this type appears to exhibit little or no affinity for the molten matrix alloy, and movement beyond the defined surface boundary of the filler material is prevented or inhibited by the barrier means. The barrier reduces any final machining or grinding that may be required of the metal matrix composite product. As stated above, the barrier preferably should be permeable or porous, or rendered permeable by puncturing, to permit the gas to contact the molten matrix alloy.

Suitable barriers particularly useful for aluminum matrix alloys are those containing carbon, especially the crystalline allotropic form of carbon known as graphite. Graphite is essentially non-wettable by the molten aluminum alloy under the described process conditions. A particularly preferred graphite is a graphite tape product that is sold under the trademark GRAFOIL®, registered to Union Carbide. This graphite tape exhibits sealing characteristics that prevent the migration of molten aluminum alloy beyond the defined surface boundary of the filler material. This graphite tape is also resistant to heat and is chemically inert. GRAFOIL® graphite material is flexible, compatible, conformable and resilient. It can be made into a variety of shapes to fit any barrier application. However, graphite barrier means may be employed as a slurry or paste or even as a paint film around and on the boundary of the filler material. GRAFOIL® is particularly preferred because it is in the form of a flexible graphite sheet. In use, this paper-like graphite is simply formed around the filler material.

As discussed earlier, the invention contemplates utilizing, for example, a GRAFOIL® sheet as both a barrier and a gating means. However, the gating means is distinct from the barrier means due to at least the positioning of each relative to the matrix metal and preform. Specifically, the barrier can define ultimate movement of the molten matrix metal within the filler material or preform after infiltration, whereas the gating means controls the amount and/or location of contact of matrix metal with the filler material or preform both before and during infiltration of the matrix metal. Moreover, it is possible for the gating means to function as both a barrier and gating means. For example, after molten matrix metal passes through the gating means, the molten matrix metal may infiltrate the filler material or preform until contacting a back side of the gating means (e.g., infiltration could occur up to the point where the gating means actively contacts the filler material or preform).

Other preferred barrier(s) for aluminum metal matrix alloys in nitrogen are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. The transition metal borides are typically in a particulate form (1–30 microns). The barrier materials may be applied as a slurry or paste to the boundaries of the permeable mass of filler material which preferably is preshaped as a preform.

Other useful barriers for aluminum metal matrix alloys in nitrogen include low-volatile organic compounds applied as a film or layer onto the external surface of the filler material. Upon firing in nitrogen, especially at the process conditions of this invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the filler material.

Thus, the barrier means may be applied by any suitable means, such as by covering the defined surface boundary with a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates when the infiltrating matrix metal reaches the defined surface boundary and contacts the barrier means.

Various demonstrations of the present invention are included in the Examples immediately following. However, these Examples should be considered as being illustrative and should not be construed as limiting the scope of the invention as defined in the appended claims.

EXAMPLE 1

FIG. 1 shows an assembly, in cross section, which can be used to form a metal matrix composite body in accordance with the present invention. Specifically, a matrix metal (5) will spontaneously infiltrate a preform (2) through gating means (3). Particularly, a GRAFOIL® box (1) measuring about 51×51×51 mm (2×2×2 inches) was assembled. The GRAFOIL® used to form the box (1) was a flexible graphite tape product that was obtained from Union Carbide having a thickness of 0.4 mm (0.015 inches). A preform (2) measuring about 51×51×13 mm (2×2×½ inches) was placed into the box (1). The preform (2) comprised approximately 12 percent by volume chopped alumina fibers (at least 90 percent by weight of the alumina fibers was Fiber FP produced by the Du Pont Company) and the alumina fibers were bound together with colloidal alumina. The colloidal alumina/fiber weight ratio was approximately ¼ and the balance of the preform volume comprised interconnected porosity. A gating means (3) was placed directly on top of the preform (2) in the GRAFOIL® box (1). The gating means (3) comprised another GRAFOIL® sheet which had five holes (30) (e.g., passageways) punched therein. The gating means (3) was sealed along the seams (4) to the GRAFOIL® box (2) by applying a mixture of graphite powder and colloidal silica. The aluminum alloy (5) was then placed directly on top of the gating means (3) in the box (1). The aluminum alloy (5) comprised about 10.5% Mg, 4% Zn, 0.5% silicon, 0.5% copper and remainder being aluminum. The aluminum alloy (5) was provided in two ingots, each measuring about 25×22×13 mm (1×⅞×½ inches). The GRAFOIL® box (1) containing the ingots (5) and preform (2) was placed into a graphite boat (6) which was partially Filled with an alumina bedding (7) of 24 grit, 38 ALUNDUM® obtained from Norton. The graphite boat (6) was then filled to a height approximately the same as the graphite box (1) contained therein. The primary purpose of the bedding (7) was to provide support for the GRAFOIL® box (1).

The graphite boat (6) containing the assemblage of FIG. 1, was placed into a controlled atmosphere electric resistance furnace (i.e., a vacuum furnace which was pumped down to $1 \times 10^{-4}$ mm Hg ($1 \times 10^{-4}$ torr)). The furnace was then backfilled with nitrogen and heated up to about 200° C. in order to purge the environment in the furnace. During subsequent heating and infiltration, nitrogen was passed through the vacuum furnace at a rate of about 2 liters per minute. The furnace was heated over a period of about 5 hours up to a temperature of about 700° C. The temperature was maintained for about 20 hours at which point the furnace was allowed to cool naturally to ambient temperatures.

Figure 3:
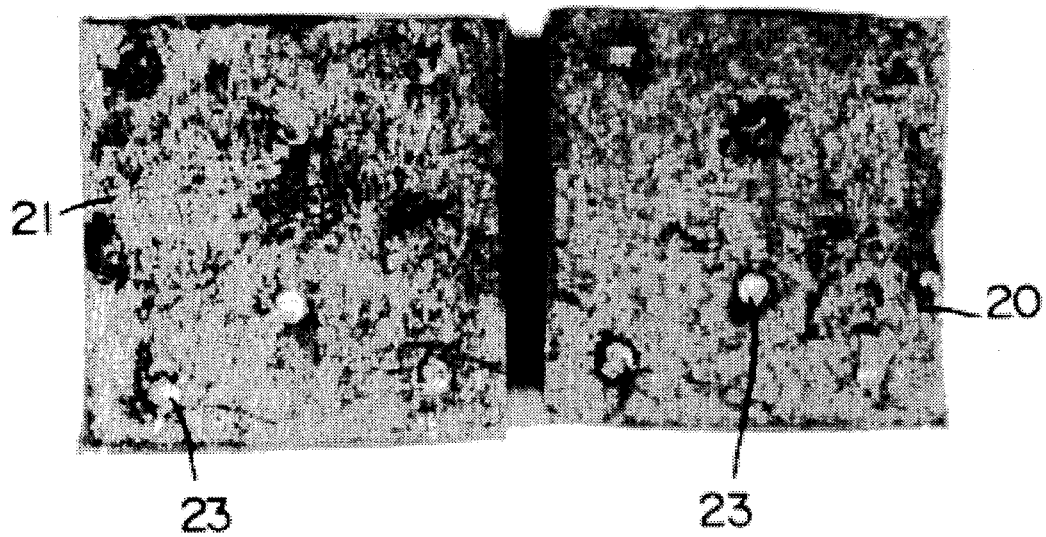
FIG. 3 is a photograph which shows both of the infiltrated preform and the carcass of matrix metal in accordance with Example 1.

After the furnace was cooled, the boat (6) and its contents were removed from the furnace. A carcass of aluminum alloy was readily removed from the preform with a hammer and chisel. Specifically, as shown in FIG. 3, the metal matrix composite (20) was substantially completely infiltrated by the matrix metal. The carcass of matrix metal (21) easily separated from the formed metal matrix composite body (20). The circular regions (23) on each of the metal matrix composite body (20) and the carcass of matrix metal (21) correspond to the passageways (30) in the gating means (3). The areal contact between the matrix metal carcass (21) and metal matrix composite (20) was minimized, thus permitting easier separation. Moreover, the surface of the metal matrix composite (20) which was in contact with the gating means (3) was sand blasted to remove remaining GRAFOIL®, thus resulting in a near-net shape metal matrix composite.

EXAMPLE 2

Figure 2:
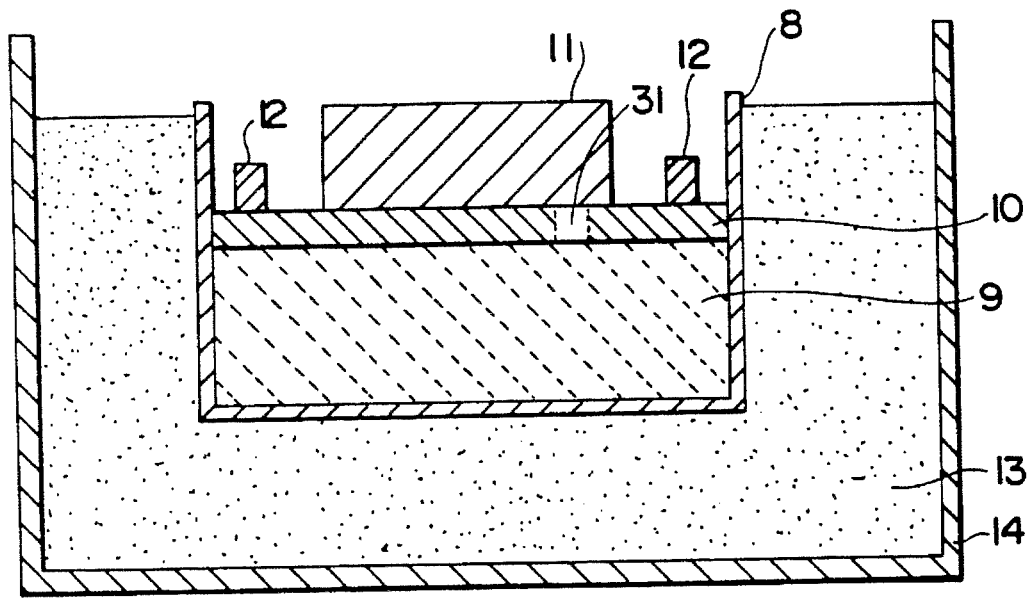
FIG. 2 is a schematic cross section of an assemblage material utilized to form a metal matrix composite body in accordance with Example 2.

FIG. 2 shows an assembly, in cross section, which was used to form a metal matrix composite body in accordance with the present invention. Specifically, a GRAFOIL® box (8) measuring about 305×152×51 mm (12×6×2 inches) was produced. A preform (9) measuring about 305×152×8 mm (12×6×0.3 inches) was placed into the box (8). The preform (9) was comprised of approximately 40.3 percent by volume of a continuous alumina fiber (at least 90 percent by weight of the alumina fibers was Fiber FP produced by the du Pont Company). The alumina fiber was silica coated and bound together with 4 percent by volume colloidal alumina wherein the fiber contained a 0°/90° orientation. A GRAFOIL® gating means (10) was placed directly above the preform (9) and sealed to the GRAFOIL® box (8) in the manner discussed above in Example 1. However, in this Example the gating means (10) had only a single rectangular opening (31) measuring about 127×25 mm (5 inches×1 inch). An aluminum alloy ingot (11) weighing about 1700 grams and including about 10.5% by weight Mg was placed directly on top of the GRAFOIL® sheet gating means (10) in box (8). The alloy (11) was positioned in such a manner that when the aluminum alloy became molten it would flow spontaneously through the gating means (10) and into the preform (9). Additionally, two stainless steel bars (12) were placed at each end of the GRAFOIL® gating means (10), but did not contact with the aluminum alloy (11). The bars (12) served to hold the gating means (10) in position during spontaneous infiltration. The GRAFOIL® box (8) was then placed into a graphite boat (14). A bedding (13) of 24 grit ALUNDUM® was placed around the box (8) in the manner described in accordance with Example 1.

The graphite boat (14) was then placed into a vacuum furnace and purged as discussed above in Example 1. During the subsequent heating and infiltration steps, nitrogen was passed through the vacuum furnace at a rate of about 2.5 liters per minute. The furnace was heated to about 725° C. over a period of about 5 hours. This temperature was maintained for about 45 hours, after which the furnace was turned off and allowed to cool naturally. The graphite boat was removed from the furnace and the carcass alloy removed from the preform as discussed above in Example 1.

Figure 4:
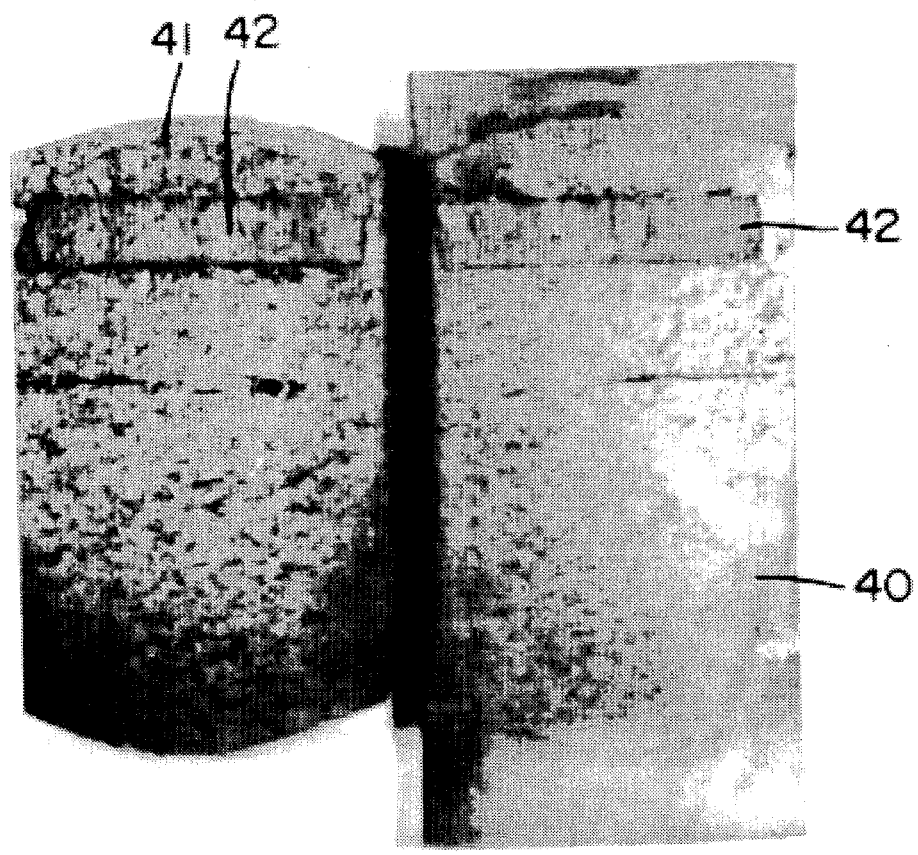
FIG. 4 is a photograph which shows both of the infiltrated preform and the carcass of matrix metal in accordance with Example 2.

Specifically, as shown in FIG. 4, the metal matrix composite (40) was substantially completely infiltrated by the matrix metal. The carcass of matrix metal (41) easily separated from the formed metal matrix composite (40) by pulling the two bodies apart. The rectangular region (42) on both bodies corresponds to the passageway (31) in the gating means (10) which permitted molten matrix metal to flow therethrough.

In each of these Examples, the GRAFOIL® box and gating means were readily removed, when necessary, by light sand or grit blasting. However, in some instances it may be necessary to lightly grind, etch, etc., to remove residual processing materials.

These two Examples demonstrate two advantages of the invention. Particularly, after the spontaneous infiltration of the metal matrix alloy into a preform has occurred, the carcass of matrix metal will not have to be machined to separate it from the metal matrix composite body. Further, the gating means prevented warping of the metal matrix composite, upon cooling. Specifically, the aluminum in the matrix metal carcass has a higher coefficient of thermal expansion than the formed metal matrix composite. Accordingly, as the carcass cools it shrinks at a higher rate than the infiltrated composite, and if the carcass is in direct contact with the formed metal matrix composite the carcass will tend to cause the composite to bend or warp (e.g., become U-shaped). The gating means of the invention provides a solution to reduce the undesirable aspects of each of the problems discussed above.

EXAMPLE 3

Figure 5:
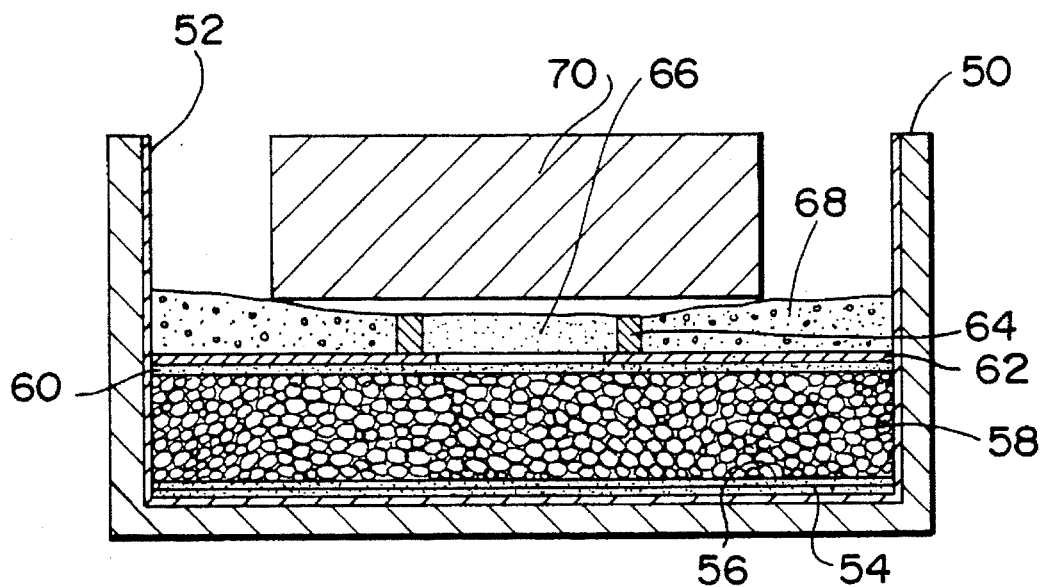
FIG. 5 is a schematic cross section of an assemblage of materials utilized to form a metal matrix composite body in accordance with Example 3.

FIG. 5 shows, in cross-section, a set-up employing a gating means to form a metal matrix composite body in accordance with the present invention. Specifically, a graphite boat 50 measuring about 8 inches (203 mm) by about 4 inches (102 mm) by about 3 inches (76 mm) high was coated on its interior surfaces with a colloidal graphite slurry 52 (DAG® 154, Acheson Colloids Company, Port Huron, Mich.) which was allowed to dry in air at room temperature for about four (4) hours. A uniform layer of magnesium powder 56 (−100 mesh, Hart Corporation, Tamaqua, Pa.) was adhered to the bottom of the graphite boat 50 using an adhesive material 54 comprising by volume about 40% RIGIDLOCK® graphite cement (Polycarbon Corporation, Valencia, Calif.) and the balance ethyl alcohol.

About 1000 grams of a filler material comprising by weight about 4 percent magnesium powder (−325 mesh, Hart Corporation) and the balance 220 grit 39 CRYSTOLON® green silicon carbide (Norton Company, Worcester, Mass.) were prepared by placing the magnesium and silicon carbide particulates into a 2 liter plastic jar and roll mixing for about 2 hours. About 704 grams of the roll mixed filler material 58 were then poured into the graphite boat 50 and leveled. A layer of −100 mesh magnesium powder 60 was then placed on top of the leveled filler material. A sheet of approximately 14 mil (0.36 mm) thick GRAFOIL® graphite foil 62 (Union Carbide Corporation, Danbury, Conn.) substantially the same length and width as the internal dimensions of the boat, and containing an approximately 1 ½ inch (38 mm) diameter hole centered in the sheet, was placed into the graphite boat 50 on top of the layer of magnesium powder 60. A graphite ring 64 measuring about 1 ¾ inch (44 mm) in diameter and about ⅜ inch (10 mm) in height was centered over the hole in the graphite foil and glued to the graphite foil using colloidal graphite (DAG® 154). The ring cavity 66 was filled with magnesium powder (−100 mesh, Hart Corporation). A 90 grit 38 ALUNDUM® alumina particulate material 68 (Norton Company, Worcester, Mass.) was then placed into the graphite boat 50 around the outside of the graphite ring 64 to a level substantially flush with the top surface of the graphite ring 64. A matrix metal ingot 70 comprising by weight about 12 percent silicon, 2 percent magnesium and the balance aluminum, and weighing about 1170 grams, was placed into the graphite boat 50 and centered over the graphite ring 64.

The graphite boat and its contents were placed into a resistance heated controlled atmosphere furnace at room temperature. The furnace chamber was evacuated to a vacuum of about 30 inches (762 mm) of mercury, then backfilled with nitrogen gas to establish a gas flow rate of about 3 liters per minute within the furnace. The furnace temperature was increased to about 525° C. at a rate of about 200° C. per hour and maintained at a temperature of about 525° C. for about an hour. The temperature was then increased to about 775° C. at a rate of about 200° C. per hour, maintained at a temperature of about 775° C. for about 10 hours, then decreased to about 675° C. at a rate of about 200° C. per hour. At a temperature of about 675° C., the graphite boat and its contents were removed from the furnace and placed on a water cooled aluminum quench plate. A FEEDOL® 9 particulate hot topping material (Foseco, Inc., Cleveland, Ohio was poured onto the top of the residual molten matrix metal. A CERABLANKET® ceramic fiber blanket (Manville Refractory Products, Denver, Colo.) measuring about 2 inches (51 mm) thick was placed over the top of the lay-up. After cooling to substantially room temperature, the lay-up was removed from the graphite boat and the uninfiltrated alumina powder was poured out. Using moderate hand pressure, the carcass of residual matrix metal was then easily separated from the formed metal matrix composite at the boundary between the metal matrix composite and the unreinforced matrix metal inside the graphite ring of the gating means.

EXAMPLE 4

Figure 6:
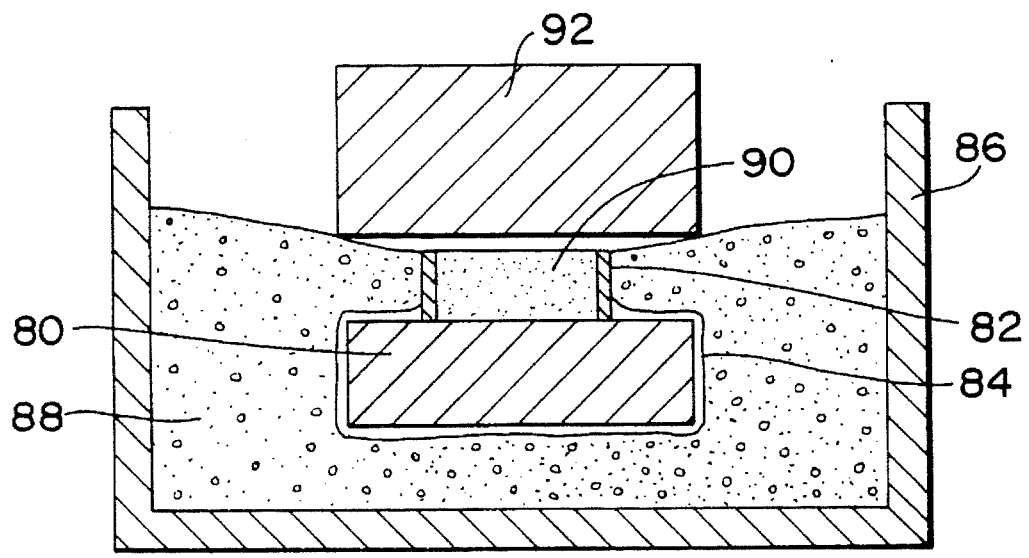
FIG. 6 is a schematic cross section of an assemblage of materials utilized to form a metal matrix composite body in accordance with Example 4.

FIG. 6 shows, in cross-section, a set-up incorporating a gating means to form a metal matrix composite body in accordance with the present invention. Specifically, a particulate mixture comprising about 200 grams of Grade A-200 aluminum nitride (Advanced Refractory Technologies, Inc., Buffalo, N.Y.) and about 10 grams of magnesium (−325 mesh, Hart Corporation, Tamaqua, Pa.) was placed into a one liter plastic jar and roll mixed for about 2 hours. The mixture was then placed into a pressing die and pressed under a uniaxially applied pressure of about 5000 psi (35 MPa) to form a preform 80 measuring about 3 inches (76 mm) by about 3 inches (76 mm) by about 0.75 inch (19 mm) thick. A graphite ring 82 measuring about 1.75 inches (44 mm) in diameter and about 0.375 inch (10 mm) high was centered on one of the 3 inch square (76 mm) faces of the preform 80. The surfaces of the preform 80 exterior to the gating means 82 were aerosol spray coated with AERODAG® GS colloidal graphite 84 (Acheson Colloids Company, Port Huron, Mich.). The graphite ring 82 and the coated preform 80 were then allowed to dry in air at room temperature for about 3 to 5 hours.

A graphite boat 86 measuring about 6 inches (152 mm) square and about 3 inches (76 mm) high was filled to a depth of about ½ inch (13 mm) with 220 grit 38 ALUNDUM® particulate alumina 88 (Norton Company). The graphite ring 82 and coated preform 80 were then placed into the graphite boat 86 on top of the alumina 88. Additional alumina was placed into the graphite boat 86 around the preform 80 and the graphite ring 82 up to a level substantially flush with the top of the graphite ring 82, but somewhat higher out near the walls of the graphite boat 86 to establish the gating means. The interior space go within the graphite ring 82 was then filled with −50 mesh magnesium powder (Hart Corporation). An approximately 623 gram ingot of matrix metal 92 comprising commercially pure aluminum metal and measuring about 3 inches (76 mm) square and about 1 ½ inches (38 mm) thick was then placed into the graphite boat 86 and centered over the graphite ring 82.

The graphite boat and its contents were placed into a resistance heated controlled atmosphere furnace at room temperature. The furnace chamber was evacuated to a vacuum of about 30 inches (762 mm) of mercury and then backfilled with nitrogen gas to establish a gas flow rate of about 3 liters per minute within the furnace. The furnace temperature was increased to about 525° C. at a rate of about 200° C. per hour, maintained at a temperature of about 525° C. for about an hour, then increased to about 775° C. at a rate of about 200° C. per hour. After maintaining a temperature of about 775° C. for about 7 hours, the temperature was decreased to about 675° C. at a rate of about 200° C. per hour. At a temperature of about 675° C., the graphite boat and its contents were removed from the furnace and placed onto a water cooled aluminum quench plate. A FEEDOL® 9 particulate hot topping material (Foseco, Inc., Cleveland, Ohio) was poured onto the top of the residual molten matrix metal. A CERABLANKET® ceramic fiber blanket (Manville Refractory Products, Denver, Colo.) measuring about 2 inches (51 mm) thick was placed on top of the lay-up. After cooling to substantially room temperature, the lay-up was removed from the graphite boat, and the uninfiltrated alumina powder was poured out. The carcass of residual matrix metal was then separated from the formed metal matrix composite by cutting through the graphite ring and the unreinforced matrix metal within.

EXAMPLE 5

In this Example, four metal matrix composite bodies were formed in a manner substantially identical to the method of Example 4, except that the four preform bodies were placed into a single graphite boat and processed simultaneously. Specifically, about 10,000 grams of dense alumina milling media, each particle measuring about 0.94 inch (24 mm) in diameter, were placed into an 8 liter porcelain ball mill. About 5000 grams of −325 mesh T64 Tabular Alumina particulate alumina (Alcoa Industrial Chemicals Div., Bauxite, Ark.) filler material was added to the mill, and the alumina filler was dry ball milled for about six hours. The milling media was then removed from the ball mill, and about 100 grams of −325 mesh magnesium (Hart Corporation, Tamaqua, Pa.) were added to the alumina filler in the ball mill, which was then roll mixed for about 2 hours. The roll mixed admixture was then transferred to the mixing chamber of a high intensity mixer (Eirich Intensive Mixer, Model RV 02, Eirich Machines Inc., Uniontown, Pa.), and about 570 grams of a binder solution comprising by weight about 20 percent QPAC™ polypropylene carbonate binder (Air Products and Chemicals, Inc., Emmaus, Pa.), 10 percent propylene carbonate (Fisher Scientific, Pittsburgh, Pa.) and the balance acetone were uniformly dispersed into the powder with the high intensity mixer. The powder was then uniaxially pressed under an applied pressure of about 10,000 psi (69 MPa) into a preform measuring about 3 inches (76 mm) square and about ⅝ inch (16 mm) thick. Three other such preforms were pressed in a similar manner.

A graphite ring measuring about 2 inches (51 mm) in diameter and about ⅜ inch (10 mm) high was glued to the center of one of the 3 inch (76 mm) square faces on each of the four preforms using a DAG® 154 colloidal graphite paste (Acheson Colloid Company, Port Huron, Mich.). The four preforms were allowed to dry in air at room temperature for about 3 to 5 hours. After drying, the four preforms were placed into a GRAFOIL® graphite foil (Union Carbide Corp., Danbury, Conn.) box measuring about 8 ½ inches (216 mm) by 11 ½ (292 mm) inches by about 4 inches (102 mm) high and spaced between ½ inch (13 mm) and 1 inch (25 mm) apart. A bedding material comprising by weight about 15 percent P54 borosilicate glass frit (Mobay Chemical Corporation, Inorganic Chemicals Div., Baltimore, Md.) and the balance equal weight proportions of 90, 220, and 500 grit El ALUNDUM™ alumina (Norton Company, Worcester, Mass.) was placed into the graphite foil box around the preforms and up to a level substantially flush with the top of the graphite rings, but slightly higher toward the walls of the graphite foil box. The interior of each graphite ring was filled with −100 mesh magnesium powder (Hart Corporation). Two matrix metal ingots comprising by weight about 9.5 to 10.6 percent magnesium, ≦0.25% silicon, ≦0.3% iron, ≦0.25% copper, ≦0.15% manganese, ≦0.15% zinc, ≦0.25% titanium, and the balance aluminum, each ingot measuring about 8 inches (203 mm) by about 4 inches (102 mm) by about 1 ½ inches (38 mm) and weighing about 2160 grams, were placed into the graphite foil box such that each matrix metal ingot contacted two preform/graphite tube assemblies. The graphite foil box and its contents were then placed into a graphite boat measuring about 9 inches (229 mm) by about (12 inches (305 mm) by about 4 inches (102 mm) tall.

The graphite boat and its contents were placed into a resistance heated controlled atmosphere furnace at room temperature. The furnace chamber was evacuated to a vacuum of about 30 inches (762 mm) of mercury, then backfilled with nitrogen gas to establish a gas flow rate of about 4 liters per minute within the furnace. The furnace temperature was increased to about 250° C. in one hour, held at about 250° C. for about one hour, then increased to about 450° C. at a rate of about 50° C. per hour. After maintaining a temperature of about 450° C. for about 1 hour, the temperature was then increased to about 775° C. at a rate of about 150° C. per hour, held at about 775° C. for about 7 hours, then decreased to about 675° C. at a rate of about 200° C. per hour. At a temperature of about 675° C., the graphite boat and its contents were removed from the furnace and placed onto a water cooled aluminum quench plate. A FEEDOL® 9 particulate hot topping material (Foseco Inc., Cleveland, Ohio) was poured onto the top of the residual molten matrix metal. A CERABLANKET® ceramic fiber blanket (Manville Refractory Products, Denver, Colo.) measuring about 2 inches (51 mm) thick was placed on top of the lay-up in the graphite boat. After cooling to substantially room temperature, the lay-up was removed from the graphite boat. The bedding of alumina and glass frit was removed from the lay-up with light hammer blows to reveal that matrix metal had infiltrated the preforms to produce four metal matrix composites. The formed metal matrix composites were then removed from the carcass of residual matrix metal by cutting through the graphite rings and the unreinforced matrix metal contained within using a saw.

EXAMPLE 6

A metal matrix composite body was formed in a manner substantially identical to the procedure for Example 4, as shown in FIG. 6, except that a graphite foil was positioned between the preform and the loose alumina bedding material, rather than a coating of colloidal graphite. Specifically, an aqueous solution of BLUONIC® A colloidal alumina (Buntrock Industries, Inc., Lively, Va.) weighing about 261.4 grams was diluted with about 522.8 grams of water and placed into a 2 liter plastic jar. About 1280.9 grams of 220 grit 39 CRYSTOLON® green silicon carbide particulate (Norton Co., Worcester, Mass.) and about 548.9 grams of 500 grit 39 CRYSTOLON® green silicon carbide particulate were added to the jar to prepare a slurry for sediment casting. The slurry was roll mixed for about 45 minutes, then poured into a silicone rubber mold with an internal cavity measuring about 7 inches (178 mm) square and about 1 ½ inches (38 mm) deep. The mold was vibrated on a vibration table for about 2 hours to assist in sedimentation, and any excess water on the surface of the formed sediment cast preform was removed with a paper towel. The silicone rubber mold was then removed from the vibration table and placed into a freezer. After the residual water in the preform had thoroughly frozen, the silicone rubber mold and preform were removed from the freezer, and the frozen sediment cast preform was withdrawn from the mold. The preform was placed on a bed of 90 grit 38 ALUNDUM® alumina particulate material (Norton Company) and allowed to dry in air at room temperature for about 16 hours.

After drying, the sediment cast preform was transferred to a bedding of 90 grit alumina supported by a refractory plate and placed into a resistance heated air atmosphere furnace for firing. The furnace temperature was increased from substantially room temperature to a temperature of about 1050° C. in a period of about 10 hours. After maintaining a temperature of about 1050° C. for about 2 hours, the temperature was decreased to substantially room temperature in a period of about 10 hours.

A GRAFOIL® graphite foil (Union Carbide Company, Danbury, Conn.) box measuring about 8.5 inches (216mm) square and about 4 inches (102 mm) high was placed into a graphite boat having interior dimensions of about 9 inches (229 mm) square and about 4 inches (102 mm) high, and the fired sediment cast preform was placed into the bottom of the graphite foil box. A bedding material comprising by weight about 15% F-69 borosilicate glass frit (Fusion Ceramics, Inc., Carrollton, Ohio) and the balance equal proportions of 90, 220, and 500 grit E1 ALUNDUM® alumina was placed into the graphite foil box around the fired sediment cast preform to a level substantially flush with the top of the preform. A thin surface layer of −100 mesh magnesium powder (Hart Corporation, Tamaqua, Pa.) was sprinkled over the top of the preform.

A graphite ring with an inside diameter measuring about 2 ½ inches (64 mm) and a height of about ½ inch (13 mm) was centered over an approximately 2 ½ inch (64 mm) diameter hole in an about 7 inch (178 mm) square sheet of 14 mil (0.36 mm) thick graphite foil. The graphite ring was then adhered to the graphite foil with a thin layer of an adhesive comprising by volume about 40% RIGIDLOCK® graphite cement (Polycarbon Corporation, Valencia, Calif.) and the balance ethyl alcohol. The joined graphite components were allowed to dry in air at room temperature for about four (4) hours.

The graphite foil and ring assembly was then placed into the graphite foil box on top of the layer of −100 mesh magnesium powder with the graphite ring facing up. The inside of the graphite ring was then filled with a dry particulate mixture comprising by weight about 1% −100 mesh magnesium powder, 1% −325 mesh magnesium powder, 29% 90 grit 39 CRYSTOLON® green silicon carbide and the balance 54 grit green silicon carbide. Additional bedding material (particulate mixture of alumina and glass frit) was then poured into the graphite box around the graphite foil and ring assembly to a height substantially flush with the top of the graphite ring, but somewhat higher out toward the walls of the graphite box. An approximately 1736 gram ingot of matrix metal measuring about 5 inches (127 mm) square and about 1 ½ inches (38 mm) thick and comprising by weight about 12% silicon, 6% magnesium, and the balance aluminum, was placed into the graphite foil box and centered over the graphite ring.

The graphite boat and its contents were placed into a resistance heated controlled atmosphere furnace at room temperature. The furnace chamber was evacuated to a vacuum of about 30 inches (762 mm) of mercury and then backfilled with nitrogen gas to establish a gas flow rate of about 3 liters per minute within the furnace. The furnace temperature was increased to about 825° C. at a rate of about 150° C. per hour, held at about 825° C. for about 20 hours, then decreased to about 700° C. at a rate of about 200° C. per hour. At a temperature of about 700° C., the graphite boat and its contents were removed from the furnace and placed onto a water cooled aluminum quench plate. A FEEDOL® 9 particulate hot topping material (Foseco, Inc., Cleveland, Ohio) was poured onto the top of the residual molten matrix metal. An approximately 2 inch (51 mm) thick layer of CERABLANKET® ceramic fiber insulation (Manville Refractory Products, Denver, Colo.) was placed on top of the graphite boat to further assist in directional solidification. After cooling to substantially room temperature, the lay-up was removed from the graphite boat.

The bedding of alumina and glass frit material was removed from around the lay-up with light hammer blows to reveal that matrix metal had infiltrated the sediment cast preform to produce a metal matrix composite of substantially the same size and shape as the preform. The carcass of residual matrix metal was then easily broken off from the formed metal matrix composite through the use of moderate hand pressure. The two pieces separated at the boundary between the metal matrix composite material inside of the graphite ring and the carcass of residual matrix metal above. The graphite ring and the metal matrix composite material within the ring were separated from the metal matrix composite by diamond machining.

EXAMPLE 7

This example further demonstrates a method for fabricating a metal matrix composite body using a gating means in accordance with the present invention.

A tape cast silicon carbide preform, obtained from Keramos Industries, Inc., Morrisville, Pa., having dimensions of about 8 inches (203 mm) by about 7 inches (177 mm) by about 0.145 inch (4 mm) thick and comprising by weight about 70% 220 grit, 10% 500 grit, 10% 800 grit, and 10% 1000 grit 39 CRYSTOLON® green silicon carbide particulate (Norton Company, Worcester, Mass.) was placed, with its flatest side facing down, on a perforated cordierite plate. The preform was covered with a sheet of FIBERFRAX® 907-J fiber insulation paper (The Carborundum Company, Niagara Falls, N.Y.). A second cordierite plate was placed on top of the fiber insulation paper to form an assembly. The assembly was placed within a room temperature air atmosphere furnace. The temperature in the furnace was increased from about room temperature to about 425° C. at a rate of about 50° C. per hour. After reaching a temperature of about 425° C., the temperature in the furnace was increased to about 1050° C. at a rate of about 200° C. per hour. After maintaining a temperature of about 1050° C. for about 1 hour, the temperature in the furnace was decreased to about room temperature in about 5 hours. The assembly was removed from the furnace, and the weight of the preform was determined to be about 257.04 grams.

The preform was placed on a rotatable platform with its flat side facing up. A first edge and the flat side of the preform were spray coated with KRYLON® acrylic spray coating (Borden, Inc., Columbus, Ohio). The rotatable platform and preform were rotated 90° and a second edge of the preform and the flat side were spray coated with KRYLON® acrylic spray coating. This procedure was repeated until all four edges of the preform were spray coated with one coat of KRYLON® acrylic spray coating and the flat side of the preform was coated with four coats of KRYLON® acrylic spray coating. A temperature of about 65° C. was established within an air atmosphere furnace, and the preform was transferred from the rotatable platform to the air atmosphere furnace. After about 10 minutes, the preform was removed from the air atmosphere furnace and placed under a fume hood until the coating had substantially dried. The preform was removed from the fume hood, placed on a balance, and a preform weight of about 257.22 grams was recorded.

A mixture comprising by volume about 50% DAG® 154 colloidal graphite (Acheson Colloids, Port Huron, Mich.) and about 50% denatured ethanol was prepared. The preform was placed on a rotatable platform with its flat side facing up, and an air brush was used to apply a thin layer of the mixture to a first edge and the flat side of the preform. The platform and preform were rotated 90° and the mixture was applied to a second edge and the flat side of the preform. This procedure was repeated until all four edges of the preform were coated with two coats and the flat side of the preform was coated with eight coats of the mixture, although due to overspray and run off of the mixture during the coating of the flat side of the preform, the thickness of the coatings on the edges approximately equalled the thickness of the coatings on the flat side of the preform, thus providing a barrier layer to the preform. Then the preform was allowed to dry. After the preform was substantially dry, the preform was placed on a balance and a preform weight of about 257.92 grams was recorded. The preform was placed on a rotatable platform with the flat side facing down. The preform was spray coated with KRYLON® acrylic spray coating in a manner substantially the same as for the KRYLON® coating described above. A temperature of about 65° C. was established within an air atmosphere furnace, then the preform was transferred from the rotatable platform to the air atmosphere furnace and heated for about 10 minutes. The preform was removed from the air atmosphere furnace and placed under a fume hood. After the preform had substantially dried, the preform was placed on a balance and a preform weight of about 258.27 grams was recorded. The preform was then placed, with its flat side facing down, on a rotatable platform and an air brush was used to apply a thin layer of the mixture to the top portion of the preform. The mixture was then allowed to dry completely. A total of three coats of the mixture were applied in this manner to form a gating means, then the preform was placed on a balance and a preform weight of about 259.23 grams was recorded.

Figure 7:
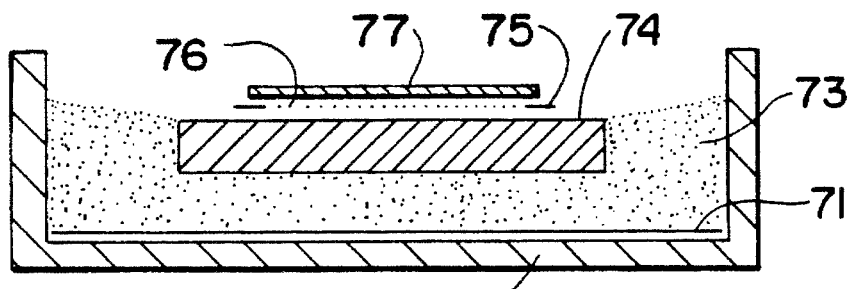
FIG. 7 is a schematic cross section of an assemblage of materials utilized to form a metal matrix composite body in accordance with Example 7.

As shown in FIG. 7, a sheet of GRAFOIL® graphite foil (71) (Union Carbide Company, Danbury, Conn.) measuring about 13 ¼ inches (337 mm) by about 9 ¼ inches (235 mm) by about 0.015 inch (0.4 mm) thick was placed into the bottom of a graphite boat (72) having inner dimensions of about 13 ¼ inches (337 mm) by about 9 ¼ inches (235 mm) by about 1 inch (25 mm) high. An about ⅜ inch (9 mm) thick layer of bedding material (73), comprising by weight about 10% F-69 borosilicate glass frit (Fusion Ceramics, Inc., Carrollton, Ohio) and the balance comprising about 70% by weight 36 grit and about 30% by weight 60 grit E-38 ALUNDUM® alumina (Norton Company, Worcester, Mass.) was poured into the graphite boat (72) on top of the GRAFOIL® sheet (71). A foam brush was used to establish a level layer of bedding material (73).

A matrix metal ingot (74) weighing about 1462.92 grams and comprising by weight about 20% silicon, 5% magnesium and the balance aluminum, was placed into an ethanol bath. The surface of the matrix metal ingot (74) was cleaned by hand utilizing a paper towel, then the matrix metal ingot (74) was removed from the ethanol bath and placed within an air atmosphere furnace. A temperature of about 68° C. was established within the furnace, and after heating the matrix metal ingot for about 15 minutes, the matrix metal ingot (74) was removed from the furnace and placed on top of the bedding material (73) within the graphite boat (72). Additional bedding material (73) was poured into graphite boat (72) around the matrix metal ingot (74) to a level substantially the same as the top portion of the matrix metal ingot (74). A sheet of GRAFOIL® graphite foil (Union Carbide Company, Danbury, Conn.) measuring about 8 ¼ inches (210 mm) by about 7 ¼ inches (184 mm) by about 0.005 inches (0.1 mm) thick was prepared by first cutting a rectangular hole measuring about 7 ⅞ inches (200 mm) by about 6 ⅞ inches (175 mm) in the center of the GRAFOIL® sheet to produce a GRAFOIL® frame (75). One side of the GRAFOIL® frame (75) was spray coated with KRYLON® acrylic spray coating. The GRAFOIL® frame (75) was then centered on top of the matrix metal ingot (74) with the acrylic coating in contact with the matrix metal ingot (74). The portion of the matrix metal ingot (74) within the inner boundaries of the GRAFOIL® frame (75) was spray coated with KRYLON® acrylic spray coating. About 5.6 grams of −50 mesh atomized magnesium (76) (Hart Corporation, Tamaqua, Pa.) were sprinkled onto the portion of the matrix metal ingot (74) within the inner boundaries of the GRAFOIL® frame (75). The GRAFOIL® frame (75), the −50 mesh atomized magnesium (76) and the matrix metal ingot (74) were then spray coated with KRYLON® acrylic spray coating, and the acrylic spray coating was allowed to dry for about 3 minutes. The preform (77) was centered on top of the GRAFOIL® frame (75), with the flat side of the preform (77) in contact with the GRAFOIL® frame (75), the −50 mesh atomized magnesium (76) and the matrix metal ingot (74).

The graphite boat (72) and its contents were placed into a resistance heated controlled atmosphere furnace at about room temperature. The furnace was sealed, evacuated to about 30 inches (762 mm) of mercury vacuum, and backfilled with nitrogen gas to about atmospheric pressure. A nitrogen gas flow rate of about 5 liters per minute was established within the furnace. The temperature in the furnace was increased from about room temperature to about 225° C. at a rate of about 200° C. per hour. After maintaining a temperature of about 225° C. for about 52 hours, the temperature in the furnace was increased to about 850° C. at a rate of about 200° C. per hour. After maintaining a temperature of about 850° C. for about 10 hours, the temperature in the furnace was decreased to about 825° C. at a rate of about 200° C. per hour. The graphite boat (72)

and its contents were then removed from the furnace. An about 15 inch (381 mm) by about 11 inch (279 mm) by about 2 inch (51 mm) thick layer of CERABLANKET® ceramic insulation material (Manville Refractory Products, Denver, Colo.) was placed onto a graphite table. A single sheet of GRAFOIL® graphite foil having dimensions of about 15 inches (381 mm) by about 11 inches (279 mm) by about 0.015 inch (0.38 mm) thick was placed on top of the CERABLANKET® fiber insulation material. The graphite boat (72) and its contents were placed on top of the GRAFOIL® graphite foil and allowed to cool. After about 13 minutes, light chisel blows were applied to the solidified matrix metal causing the formed metal matrix composite to separate from the matrix metal.

EXAMPLE 8

This Example further demonstrates a method for fabricating metal matrix composite bodies using a gating means in accordance with the present invention.

A total of 18 injection molded preforms comprising essentially 220 grit and 1000 grit silicon carbide particulate were obtained from Technical Ceramics Laboratories, Inc., Alpharetta, Ga.

An about 12 inch (305 mm) long by about 6 inch (152 mm) wide sheet of FIBERFRAX® 907-J fiber insulation paper (The Carborundum Company, Niagara Falls, N.Y.) was placed onto a refractory plate having dimensions of about 12 inches (304 mm) long by about 6 inches (152 mm) wide by about 1 inch (25 mm) thick and the preforms were placed onto the fiber insulation paper. The refractory plate/ fiber insulation paper/preform assembly was placed within a room temperature air atmosphere furnace. The temperature in the furnace was increased from about room temperature to about 425° C. in about 8 hours. The temperature in the furnace was then increased to about 1050° C. in about 3 hours. After maintaining a temperature of about 1050° C. for about 1 hour, the temperature in the furnace was decreased to about room temperature in about 5 hours. The refractory plate/fiber insulation paper/preform assembly was removed from the furnace.

Each preform was weighed and the weight recorded, with preform weights ranging from about 5.78 grams to about 5.96 grams. All 18 preforms were then treated in the following manner. A preform was placed on a rotatable platform with its flat side facing up. The flat side and edges of the preform were lightly spray coated with KRYLON® acrylic spray coating (Borden, Inc., Columbus, Ohio). The rotatable platform and preform were slowly rotated to insure that each edge of the preform was lightly coated with KRYLON® acrylic spray coating. A temperature of about 65° C. was established within an air atmosphere furnace, and the preform was transferred from the rotatable platform to the air atmosphere furnace. After about 10 minutes, the preform was removed from the air atmosphere furnace and placed under a fume hood until the coating had substantially dried. A mixture comprising by volume about 50% DAG® 154 colloidal graphite (Acheson Colloids, Port Huron, Mich.) and about 50% denatured ethanol was prepared. The preform was placed on a rotatable platform with its flat side facing up, and an air brush was used to apply a thin layer of the mixture to the flat side and edges of the preform. The platform and preform were rotated to insure that all edges were spray coated with a substantially uniform layer of the mixture. The mixture was allowed to dry and the procedure was repeated. A total of about 0.04 grams of the mixture was applied to form a barrier on the top and edges of the preform. The preform was placed on a rotatable platform with its flat side facing down. The preform was spray coated with KRYLON® acrylic spray coating in a manner substantially the same as for the KRYLON® coating described above. A temperature of about 65° C. was established within an air atmosphere furnace, the preform was transferred from the rotatable platform to the air atmosphere furnace and heated for about 10 minutes. The preform was removed from the air atmosphere furnace and placed under a fume hood. After the preform had substantially dried, the preform was placed, with its flat side facing down, on a rotatable platform and an air brush was used to apply a thin layer of the mixture to the exposed surfaces of the preform. The mixture was then allowed to dry completely. A total of 3 layers of the mixture were applied in this manner to form a gating means, with a total weight of about 0.02 grams of the mixture being applied.

Figure 8:
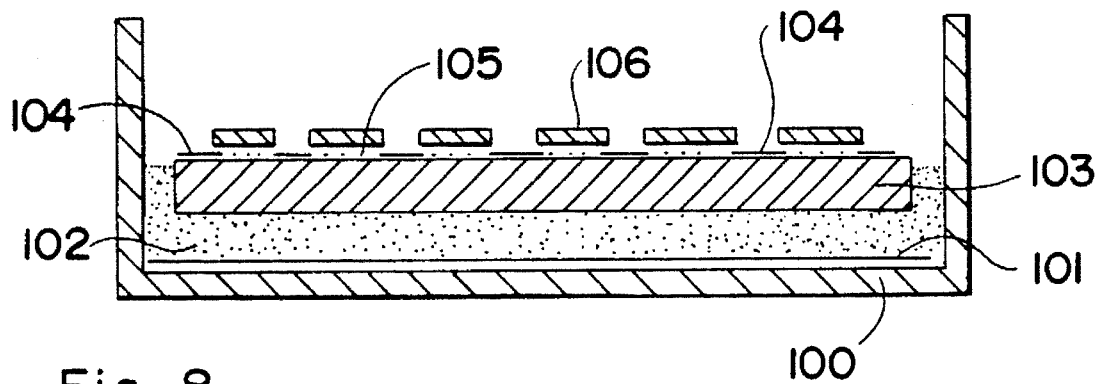
FIG. 8 is a schematic cross section of an assemblage of materials utilized to form a metal matrix composite body in accordance with Example 8.

As shown in FIG. 8, a sheet of GRAFOIL® graphite foil (101) (Union Carbide Company, Danbury, Conn.), measuring about 13 ¼ inches (337 mm) by about 9 ¼ inches (235 mm) by about 0.015 inch (0.4 mm) thick was placed into the bottom of the graphite boat (100) having inner dimensions of about 13 ¼ inches (337 mm) by about 9 ¼ inches (235 mm) by about 1 inch (25 mm) high. An about ⅜ inch (9 mm) thick layer of bedding material (102), comprising by weight about 60% 36 grit E-38 ALUNDUM® alumina (Norton Company, Worcester, Mass.), about 17% 90 grit E-1 ALUNDUM® alumina (Norton Company) and about 13% F-69 borosilicate glass frit (Fusion Ceramics, Inc., Carrollton, Ohio) was poured into the graphite boat (100) on top of the GRAFOIL® sheet (101). A foam brush was used to establish a level layer of bedding material (102).

A matrix metal ingot (103) weighing about 1013 grams and comprising by weight about 15% silicon, 5% magnesium and the balance aluminum, was placed into an ethanol bath. The surface of the matrix metal ingot (103) was cleaned by hand utilizing a paper towel, then the matrix metal ingot (103) was removed from the ethanol bath and placed within an air atmosphere furnace. A temperature of about 68° C. was established within the furnace, and after heating the matrix metal ingot for about 15 minutes, the matrix metal ingot (103) was removed from the furnace and placed on top of the bedding material (102) within the graphite boat (100). Additional bedding material (102) was poured into the graphite boat (100) around the matrix metal ingot (103) to a level substantially the same as the top portion of the matrix metal ingot (103). A sheet of GRAFOIL® graphite foil (Union Carbide Company, Danbury, Conn.) having a length and width substantially the same as that of the exposed surface of the matrix metal ingot (103) and a thickness of about 0.005 inches (0.1 mm) was prepared by first cutting out 18 rectangular holes measuring about ⅛ inch (3 mm) less than the length of the preforms and about ⅛ inch (3 mm) less then the width of the preforms. One side of the GRAFOIL® graphite foil (104) was spray coated with KRYLON® acrylic spray coating. The GRAFOIL® graphite foil (104) was then centered on top of the matrix metal ingot (103) with the acrylic coating in contact with the matrix metal ingot (103). The portions of the matrix metal ingot within the inner boundaries of the holes in the GRAFOIL® graphite foil (104) were spray coated with KRYLON® acrylic spray coating. About 0.13 gram of −50 mesh atomized magnesium (105) (Hart Corp., Tamaqua, Pa.) was sprinkled onto the portions of the matrix metal ingot (103) within the inner boundaries of each hole in the GRAFOIL® graphite foil (104). The GRAFOIL® graphite foil (104), the −50 mesh atomized magnesium (105) and the matrix metal ingot (103) were then spray coated with KRYLON® acrylic spray coating, and the acrylic spray coating was allowed to dry for about 3 minutes. One preform (106) was centered on top of each cut-out portion of the GRAFOIL® graphite foil (104), with the flat side of each preform (106) in contact with the GRAFOIL® graphite foil (104), the −50 mesh atomized magnesium (105) and the matrix metal ingot (103).

The graphite boat (100) and its contents were placed into a resistance heated controlled atmosphere furnace at about room temperature. The furnace was sealed, evacuated to about 30 inches (762 mm) of mercury vacuum, and back-filled with nitrogen gas to about atmospheric pressure. A nitrogen gas flow rate of about 5 liters per minute was established within the furnace. The temperature in the furnace was increased from about room temperature to about 225° C. in about 1 hour. After maintaining a temperature of about 225° C. for about 2 hours, the temperature in the furnace was increased to about 850° C. at a rate of about 200° C. per hour. After maintaining a temperature of about 850° C. for about 10 hours, the temperature in the furnace was decreased to about 825° C. at a rate of about 200° C. per hour. The graphite boat (100) and its contents were then removed from the furnace. An about 15 inch (381 mm) by about 11 inch (279 mm) by about 2 inch (51 mm) thick layer of CERABLANKET® ceramic insulation material (Manville Refractory Products, Denver, Colo.) was placed onto a graphite table. A single sheet of GRAFOIL® graphite foil having dimensions of about 15 inches (381 mm) by about 11 inches (279 mm) by about 0.015 inch (0.38 mm) thick was placed on top of the CERABLANKET® fiber insulation material. The graphite boat (100) and its contents were placed on top of the GRAFOIL® graphite foil and allowed to cool. After the graphite boat (100) and its contents had reached substantially room temperature, the formed metal matrix composite bodies were easily removed by hand from the surface of the solidified matrix metal.

EXAMPLE 9

This Example provides comparative examples which demonstrate the benefits of fabricating a metal matrix composite body using a gating means in accordance with the present invention. Sample A illustrates a method for forming a metal matrix composite body utilizing a gating means of the present invention. Sample B illustrates a method of forming a comparable metal matrix composite body without a gating means.

SAMPLE A

A metal matrix composite body was fabricated in essentially the same manner as described in Example 7, with the following exceptions. The preform dimensions were about 6 ½ inches (165 mm) by about 7 inches (177 mm) by about 0.08 inch (2 mm) thick. When removed from the air atmosphere furnace, the preform weight was determined to be about 115.79 grams. After the first application of KRYLON® acrylic spray coating, a preform weight of about 116.54 grams was recorded. After the first DAG® 154 colloidal graphite mixture was applied, the preform weight was determined to be about 117.02 grams. After the second coating of KRYLON® acrylic spray coating, the preform weight was determined to be about 117.39 grams. After the final application of the mixture, the preform weight was determined to be about 118.14 grams. The bedding material comprised by weight about 13% F-69 borosilicate glass frit (Fusion Ceramics, Inc., Carrollton, Ohio), about 60% 36 grit E38 ALUNDUM® alumina (Norton Company, Worcester, Mass.) and about 17% 90 grit E1 ALUNDUH® alumina (Norton Company). The matrix metal ingot had a weight of about 1404.28 grams. The GRAFOIL® graphite foil (Union Carbide Company, Danbury, Conn.) window had outer dimensions of about 6 ¾ inches (171 mm) by about 7 ¼ inches (184 mm). The rectangular holes in the center of the GRAFOIL® sheet had dimensions of about 6 ⅜ inches (162 mm) by about 6 ⅞ inches (175 mm). About 4.6 grams of −50 mesh atomized magnesium was sprinkled onto the portion of the matrix metal ingot within the inner boundaries of the GRAFOIL® frame.

Figure 9:
FIG. 9 is a photograph at 0.3X magnification of a metal matrix composite body formed in Example 9, Sample A, showing the surface of the body which contacted a gating means.

The temperature within the resistance heated controlled atmosphere furnace was maintained at about 225° C. for about 2 hours. An about 7 inch (178 mm) by about 6 ½ inch (165 mm) by about 2 inch (51 mm) thick layer of CERA-BLANKET® ceramic insulation material (Manville Refractory Products, Denver, Colo.) was prepared by cutting out a rectangular section measuring about 5 inches (127 mm) by about 4 ½ inches (114 mm) from the center of the ceramic insulation material to form a fiber blanket window frame. After the graphite boat and its contents were removed from the furnace and allowed to cool to about 550° C. (when the matrix metal solidified) the fiber blanket window frame was centered on top of the now formed metal matrix composite and the assembly was allowed to cool to room temperature. Upon reaching room temperature, the fiber blanket window frame was removed from the metal matrix composite body and the metal matrix composite body was removed by hand from the solidified matrix metal. FIG. 9 is a photograph of the surface of the metal matrix composite body that had been in contact with the gating means which controlled the areal contact between the filler material and the matrix metal.

SAMPLE B

A tape cast silicon carbide preform having dimensions of about 8 inches (203 mm) by about 7 inches (177 mm) by about 0.08 inch (2 mm) thick and comprising by weight about 70% 220 grit, 10% 500 grit, 10% 800 grit, and 10% 1000 grit 39 CRYSTOLON® green silicon carbide particulate (Norton Company, Worcester, Mass.) was placed, with its flattest side facing down, on a perforated cordierite plate. The preform was covered with a sheet of FIBERFRAX® 907-J fiber insulation paper (The Carborundum Company, Niagara Falls, N.Y.). A second cordierite plate was placed on top of the fiber insulation paper to form an assembly. The assembly was placed within a room temperature air atmosphere furnace. The temperature in the furnace was increased from about room temperature to about 425° C. in about 8 hours. After maintaining a temperature of about 425° C. for about 1 hour, the temperature in the furnace was increased to about 1050° C. in about 3 hours. After maintaining a temperature of about 1050° C. for about 2 hours, the temperature in the furnace was decreased to about room temperature in about 5 hours. The assembly was removed from the furnace, and the weight of the preform was determined to be about 160.03 grams.

A mixture comprising by volume about 50% DAG® 154 colloidal graphite (Acheson Colloids, Port Huron, Mich.) and about 50% denatured ethanol was prepared. An air brush was used to apply a thin layer of barrier coating to one 8 inch (203 mm) by 7 inch (177 mm) side of the preform. The coating was allowed to dry, and two additional coatings were applied in this manner. The preform was placed on a balance and a preform weight of about 161.1 grams was recorded.

A sheet of GRAFOIL® graphite foil (Union Carbide Company, Danbury, Conn.) measuring about 13 ¼ inches (337 mm) by about 9 ¼ (235 mm) inches by about 0.015 inch (0.4 mm) thick was placed into the bottom of a graphite boat having inner dimensions of about 13 ¼ inches (337 mm) by about 9 ¼ inches (235 mm) by about 1 inch (25 mm) high. An about ⅜" (9 mm) thick layer of bedding material, comprising by weight about 13% F-69 borosilicate glass frit (Fusion Ceramics, Inc., Carrollton, Ohio) and the balance 90 grit E-38 ALUNDUM® alumina (Norton Company, Worcester, Mass.) was poured into the graphite boat on top of the GRAFOIL® sheet. A foam brush was used to establish a level layer of bedding material.

A matrix metal ingot weighing about 2600 grams and comprising by weight about 20% silicon, 5% magnesium and the balance aluminum, was placed into an ethanol bath. The surface of the matrix metal ingot was cleaned by hand utilizing a paper towel, then the matrix metal ingot was removed from the ethanol bath and placed within an air atmosphere furnace. A temperature of about 68° C. was established within the furnace, and after heating the matrix metal ingot for about 10 minutes, the matrix metal ingot was removed from the furnace and placed on top of the bedding material within the graphite boat. Additional bedding material was poured into the graphite boat around the matrix metal ingot to a level substantially the same as the top portion of the matrix metal ingot. About 5.6 grams of −50 mesh atomized magnesium (Hart Corporation, Tamaqua, Pa.) was sprinkled onto the top portion of the matrix metal ingot. The preform was placed into the graphite boat, with the uncoated side of the preform in contact with the −50 mesh atomized magnesium and the matrix metal ingot.

Figure 10:
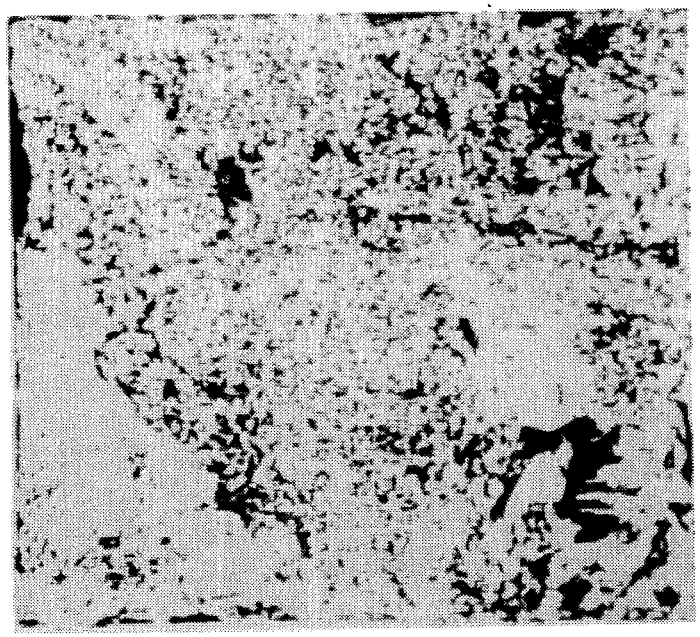
FIG. 10 is a photograph at 0.3X magnification of a formed metal matrix composite body formed in Example 9, Sample B, showing the surface which contacted a molten matrix metal (without the use of a gating means)

The graphite boat and its contents were placed into a resistance heated controlled atmosphere furnace at about room temperature. The furnace was sealed, evacuated to about 30 inches (762 mm) of mercury vacuum, and backfilled with nitrogen gas to about atmospheric pressure. A nitrogen gas flow rate of about 5 liters per minute was established within the furnace. The temperature in the furnace was increased from about room temperature to about 225° C. at a rate of about 200° C. per hour. After maintaining a temperature of about 225° C. for about 52 hours, the temperature in the furnace was increased to about 850° C. at a rate of about 200° C. per hour. After maintaining a temperature of about 850° C. for about 7 hours, the temperature in the furnace was decreased to about 825° C. at a rate of about 200° C. per hour. The graphite boat and its contents were then removed from the furnace. An about 15 inch (381 mm) by about 11 inch (279 mm) by about 2 inch (51 mm) thick layer of CERABLANKET® ceramic insulation material (Manville Refractory Products, Denver, Colo.) was placed onto a graphite table. A single sheet of GRAFOIL® graphite foil having dimensions of about 15 inches (381 mm) by about 11 inches (279 mm) by about 0.015 inch (0.38 mm) thick was placed on top of the CERABLANKET® fiber insulation material. The graphite boat and its contents were placed on top of the GRAFOIL® graphite foil and a model 500 air gun (Milwaukee Heat Tools, Inc., Milwaukee, Wis.) was set to cold and turned on. The cool air stream was directed at the formed metal matrix composite and the matrix metal carcass to assist in cooling the assembly. After about 3 minutes, the metal matrix composite was removed from the graphite boat, utilizing a stainless steel spatula, placed on the graphite table, and allowed to cool to room temperature. FIG. 10 is a photograph of the surface of the metal matrix composite that had been in contact with the matrix metal.

EXAMPLE 10

About 166.5 grams of a mixture comprising by weight about 30% AIRVOL® PVA (Air Products and Chemicals, Inc., Allentown, Pa.) and about 70% deionized water was placed into a plastic jar. About 24.9 grams of polyethylene glycol 400 (J. T. Baker, Inc., Jackson, Tenn.), about 2.4 grams of zinc stearate (Fischer Scientific, Pittsburgh, Pa.) and about 106.2 grams of LUDOX® SM (E. I. DuPont DeNemours and Co., Inc., Wilmington, Del.) were added to the jar. A hand-held drill with an impeller attachment was used to thoroughly mix the contents of the jar to prepare a binder solution.

About 1750 grams of 320 grit, about 250 grams of 800 grit, and about 250 grams of 1000 grit 39 CRYSTOLON® green silicon carbide particulate (Norton Company, Worcester, Mass.), and about 250 grams of LC12N $Si_3N_4$ powder (Herman C. Stark, Berlin, Germany) were added to a one gallon plastic jar (Fischer Scientific, Pittsburgh, Pa.) which was then placed on a jar mill and roll mixed for about two hours. The plastic jar and its contents were then removed from the jar mill and the contents of the jar were poured into a Model RV02 Eirich mixer (Eirich Machines, Maple, Ontario, Canada). About 100 grams of the binder solution was poured into the mixer, and the mixer was turned on with the pan and rotor settings set to fast. After about one minute, the mixer was turned off, a plastic straight edge was utilized to remove any silicon carbide particulate or silicon nitride powder from the sides of the mixer bowl, and an additional about 100 grams of binder solution was added to the mixer. The mixer was turned on a second time with the pan and rotor settings set to fast. After about one minute, the mixer was turned off, a plastic straight edge was used to scrape any silicon carbide particulate or silicon nitride powder from the sides of the bowl, and an additional about 100 grams of binder solution was added to the mixer. The mixer was turned on a third time with the pan and rotor settings set to fast. After about one minute, the mixer was turned off and the binder/silicon carbide particulate/silicon nitride powder mixture was poured onto a table that had been previously covered with brown paper. An about ⅛ inch (3 mm) to about ¼ inch (6 mm) thick layer of the mixture was established on the brown paper and the mixture was allowed to dry overnight.

The mixture was placed into a Model B Ro-tap testing sieve shaker (Tyler Combustion Engineering, Inc.) and sifted through a 25 mesh screen. About 160 grams of the mixture was placed into a die mold having dimensions of about 3 inches (76 mm) square and pressed at about 90 tons of pressure utilizing a CARVER® air type hydraulic press (Fred S. Carver, Inc., Menomonee Falls, Wis.). The resultant preform was removed from the hydraulic press and preform dimensions of about 3 inches (76 mm) square by about ½ inch (13 mm) thick were recorded. A total of four preforms were prepared in this manner. The preforms were then placed onto a refractory support plate, which had been covered with a sheet of FIBERFRAX® 907-J fiber insulation paper (The Carborundum Company, Niagara Falls, N.Y.). The supported preforms were placed into a room temperature resistance heated air atmosphere furnace. The furnace temperature was raised from about room temperature to about 500° C. at a rate of about 100° C. per hour. After maintaining a temperature of about 500° C. for about two hours, the temperature was then increased from about 500° C. to about 850° C. at a rate of about 200° C. per hour. After maintaining a temperature of about 850° C. for about four hours, the temperature was decreased to about room temperature in about five hours.

A foam brush was utilized to apply a uniform coating of DAG® 154 colloidal graphite (Acheson Colloids Co., Port Huron, Mich.) to the four ½ inch (13 mm) thick sides and one 3 inch (76 mm) square side of each preform. The coating was allowed to dry and a second coating of DAG® 154 colloidal graphite was applied to the five sides of each preform previously coated. Each preform was turned over and the final side was coated with DAG® 154 colloidal graphite. However, before the DAG® 154 colloidal graphite on the final side could substantially dry, excess DAG® 154 was removed from the surface of the preform utilizing a paper towel thereby forming a very thin coating. A second coating of DAG® 154 colloidal graphite was applied to the final side of each preform and a paper towel was again used to remove excess coating before it dried, again forming a very thin coating for use as a gating means.

A graphite boat having internal dimensions of about 10 inches (254 mm) square by about 4 inches (102 mm) deep was prepared by lining the bottom of the graphite boat with a sheet of GRAFOIL® graphite foil (Union Carbide Company, Danbury, Conn.) having dimensions of about 10 inches (254 mm) square by about 0.015 inch (0.38 mm) thick. An about 1 inch (25 mm) thick layer of a bedding material comprising by weight about 97 ½% 90 grit E1 ALUNDUM® alumina (Norton Company, Worcester, Mass.) and about 2 ½% F-69 borosilicate glass frit (Fusion Ceramics, Inc., Carrollton, Ohio) was poured into the graphite boat and onto the GRAFOIL® sheet. A foam brush was used to establish a level layer of bedding material. A matrix metal ingot having dimensions of about 7 inches (178 mm) square by about ½ inch (13 mm) high, weighing about 1003 grams and comprising by weight about 15% silicon, 5% magnesium and the balance aluminum, was placed into the graphite boat and onto the bedding material. Four equally spaced holes measuring about 2 ⅞ inches (73 mm) square were cut out of a GRAFOIL® graphite foil sheet having dimensions of about 7 inches (178 mm) square by about 0.015 inch (0.38 mm) thick. The GRAFOIL® sheet was placed into the graphite boat and centered over the matrix metal ingot. A total of about 1.8 grams of −50 mesh atomized magnesium (Hart Corporation, Tamaqua, Pa.) was evenly dispersed throughout the four holes in the GRAFOIL® sheet. The four preforms were placed into the graphite boat so that one preform was centered over each hole in the GRAFOIL® sheet and such that the final side (as identified above) of each preform containing the gating means was in contact with the magnesium layer.

The graphite boat and its contents were placed into a resistance heated controlled atmosphere furnace at about room temperature. The furnace was sealed, evacuated to about 30 inches (762 mm) of mercury vacuum, and backfilled with nitrogen gas to about atmospheric pressure. A nitrogen gas flow rate of about 5 liters per minute was established within the furnace. The temperature in the furnace was increased from about room temperature to about 200° C. at a rate of about 200° C. per hour. After maintaining a temperature of about 200° C. for about six hours, the temperature in the furnace was increased to about 550° C. at a rate of about 200° C. per hour. After maintaining a temperature of about 550° C. for about two hours, the temperature in the furnace was increased to about 875° C. at a rate of about 200° C. per hour. After maintaining a temperature of about 875° C. for about 30 hours, the temperature in the furnace was decreased to about 700° C. at a rate of about 200° C. per hour. The graphite boat and its contents were then removed from the furnace. An about 10 inch (254 mm) square sheet of FIBERFRAX® 907-J fiber insulation paper (Carborundum Company, Niagara Falls, N.Y.) was placed onto a graphite table. The graphite boat and its contents were placed on top of the FIBERFRAX® insulation material and allowed to cool to room temperature. Upon reaching room temperature, the formed metal matrix composite bodies were easily removed from the solidified matrix metal by inverting the solidified matrix metal and applying light hammer blows to the bottom of the matrix metal, yielding a metal matrix composite with a net or near-net surface finish on the side that contacted the gating means.

EXAMPLE 11

An aqueous solution of BLUONIC® A colloidal alumina (Wesbond Corp., Wilmington, Del.) weighing about 1034 grams was diluted with about 2082 grams of deionized water and placed into a 5 liter NALGENE® plastic jar (Nalge Company, Rochester, N.Y.). About 7267 grams of 220 grit and about 3116 grams of 500 grit 39 CRYSTOLON® green silicon carbide particulate (Norton Company, Worcester, Mass.), and about 109 grams of colloids 581-B defoamer (Colloids, Inc., Newark, N.J.) were added to the jar to prepare a slurry for sediment casting. The jar and its contents were placed on a jar mill and roll mixed for about 5 hours.

A Grade GI-1000 silicone rubber mold (Plastic Tooling Supply Company, Exton, Pa.) having a hexagonal shaped internal cavity with sides measuring about 2 ¼ inches (57 mm) and a depth of about 2 inches (51 mm) was placed onto a flat rigid aluminum plate. The mold/plate assembly was then placed onto a level vibrating table. The vibrating table was turned on and approximately 680 grams of the slurry were poured into the mold in a smooth and continuous manner. The mold and its contents were subjected to vibration for at least about 1 hour to condense the slurry into a preform, with excess surface liquid being removed with a sponge. The vibrating table was turned off and the mold/plate/preform assembly was placed into a freezer. Residual water in the preform was permitted to freeze thoroughly, then the mold/plate/preform assembly was removed from the freezer and the frozen sediment cast preform, with sides measuring about 2 ¼ inches (57 mm) and a thickness of about ¾ inch (19 mm), was removed from the mold. The preform was then placed onto a refractory support plate, which had been covered with a sheet of FIBERFRAX® 907-J fiber insulation paper (The Carborundum Company, Niagara Falls, N.Y.). A temperature of about 25° C. was established within a resistance heated air atmosphere furnace, and the supported preform was placed into the furnace. After about 12 hours, the furnace temperature was increased from about 25° C. to about 85° C. in about 2 hours. After maintaining a temperature of about 85° C. for about 12 hours, the temperature was then increased from about 85° C. to about 1050° C. in about 10 hours. After maintaining a temperature of about 1050° C. for about 2 hours, the temperature was decreased to about room temperature in about 10 hours.

The refractory plate/fiber insulation paper/preform assembly was removed from the furnace, and the top portion of the preform was lightly sanded to establish a flat surface. A mixture to be used as a barrier coating comprising by volume about 50% DAG® 154 colloidal graphite (Acheson Colloids, Port Huron, Mich.) and about 50% denatured ethanol was prepared. The preform was placed on a table with the sanded side facing down. A foam brush was used to apply a thin layer of barrier coating to the exposed surfaces of the preform. The barrier coating was allowed to substantially dry, then the procedure was repeated a second time. The preform was turned over and a thin coating of a gating means mixture, comprising by weight about 33.7% A-1000 alumina (Aluminum Company of America, Pittsburgh Pa.), about 67% denatured ethanol, and about 0.3% HYPER-MER® KD2 dispersant (ICI Americas, Wilmington, Del.), was applied to the sanded surface of the preform utilizing a foam brush. The gating means mixture was allowed to dry. A total of 3 coatings of the gating means mixture were applied in this manner.

Figure 11:
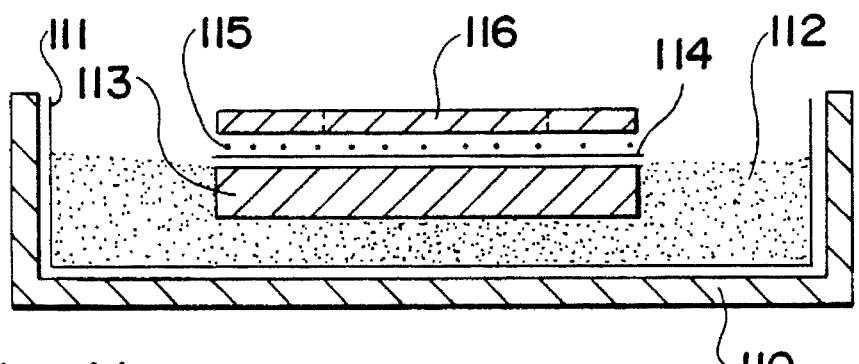
FIG. 11 is a schematic cross section of an assemblage of materials utilized to form a metal matrix composite body in accordance with Example 10.

As shown in cross-section in FIG. 11, a graphite foil box (111) measuring about 11 ¼ inches (286 mm) by about 6 ¼ inches (159 mm) and about 7 inches (178 mm) high, was fabricated from a single sheet of GRAFOIL® graphite foil (Union Carbide Company, Danbury, Conn.) measuring about 0.015 inch (0.38 mm) thick by making strategically located cuts and folds in the sheet. The folds in the GRAFOIL® sheet were cemented together with RIGID-LOCK® graphite cement (Polycarbon Corp., Valencia, Calif.). Strategically placed staples helped to reinforce the graphite cement. The GRAFOIL® box (111) was then placed within a graphite boat (110) having inner dimensions which were substantially the same as the outer dimensions of the GRAFOIL® box (111).

An about 1 inch (25 mm) thick layer of bedding material (112), comprising by weight about 9% F69 borosilicate glass frit (Fusion Ceramics, Inc., Carrollton, Ohio), about 27% 90 grit E1 ALUNDUM® alumina (Norton Company, Worcester, Mass.), and about 64% 36 grit E38 ALUNDUM® alumina (Norton Company) was poured into the GRAFOIL® box (111) and leveled. A matrix metal ingot (113) having dimensions of about 3 ½ inches (89 mm) by about 4 inches (102 mm) by about 2 inches (51 mm) and weighed about 1250 grams and comprising by weight about 12 ½% silicon, 5% magnesium and the balance aluminum, was placed into the GRAFOIL® box (111) and onto the bedding material (112). A hexagonal shaped commercially available 6061 aluminum sheet (114) with sides measuring about 2 ¼ inches (57 mm) and about 0.05 inch (1 mm) thick, was placed into the GRAFOIL®box (111) and centered over the matrix metal ingot (113). Additional bedding material (112) was poured into the GRAFOIL® box (111) around the matrix metal ingot (113) to a level substantially flush with the top of the aluminum sheet (114). About 2 grams of −50 mesh ground magnesium (115) (Hart Corp., Tamaqua, Pa.) was evenly dispersed onto the aluminum sheet (114). The preform (116) was placed into the GRAFOIL® box (111) with the sanded side in contact with the magnesium (115).

The graphite boat (110) and its contents were placed into a resistance heated controlled atmosphere furnace at about room temperature. The furnace was sealed, evacuated to about 30 inches (762 mm) of mercury vacuum and heated to about 50° C. in about 1 hour. After maintaining a temperature of about 50° C. and a vacuum level of about 30 inches (762 mm) of mercury vacuum for about 1 hour, the furnace was backfilled with nitrogen gas to about atmospheric pressure and a nitrogen gas flow rate of about 250 cubic feet per hour (2 liters per second) was established. The temperature within the furnace was increased to about 100° C. in about ½ hour. After maintaining a temperature of about 100° C. for about 1 hour, the temperature was increased to about 200° C. in about one hour. After maintaining a temperature of about 200° C. for about 1 hour, the temperature in the furnace was increased to about 800° C. in about 3 hours. After maintaining a temperature of about 800° C. for about 12 hours, the temperature in the furnace was decreased to about room temperature in about 4 hours. The furnace door was opened, and the graphite boat (110) and its contents were removed from the furnace and placed on a table. The formed metal matrix composite was separated from the solidified matrix metal carcass by applying light hammer blows to the solidified matrix metal carcass.

While the preceding Examples have been described with particularity, various modifications to these Examples may occur to an artisan of ordinary skill, and all such modifications should be considered to be within the scope of the claims appended hereto.

We claim:

1. A method for making a metal matrix composite, comprising:

providing a permeable mass comprising a filler or a preform;

providing a source of molten matrix metal; interposing a gating means between said source of molten matrix metal and said permeable mass, thereby forming at least one interface selected from the group of interfaces consisting of (1) an interface between said gating means and said matrix metal and (2) an interface between said gating means and said permeable mass;

providing a separation facilitator to at least a portion of said at least one interface; and infiltrating a portion of said molten matrix metal into at least a portion of said permeable mass through said gating means and said separation facilitator.

2. The method of claim 1, wherein said infiltrating comprises spontaneous infiltration.

3. The method of claim 1, wherein said separation facilitator comprises a material selected from the group consisting of a metal, a reducible oxide and a reducible nitride.

4. The method of claim 1, wherein said gating means comprises a graphite material.

5. The method of claim 4, wherein said graphite material comprises at least one material selected from the group consisting of a graphite sheet material and a graphite tape material.

6. The method of claim 4, wherein said graphite material comprises a colloidal graphite which is applied to at least a portion of at least one surface of said permeable mass by at least one process selected from the group consisting of spraying, painting and dipping and wherein a plurality of channels are created in said graphite material by utilizing a masking means.

7. The method of claim 1, wherein said gating means comprises a material which is substantially impermeable to molten matrix metal under the infiltrating conditions.

8. The method of claim 7, wherein said gating means includes at least one passage through which molten matrix metal can flow.

9. The method of claim 8, wherein said at least one passage comprises a plurality of through holes.

10. The method of claim 8, wherein said at least one passage comprises at least one channel which is substantially completely surrounded by material which is non-infiltratable under the infiltration conditions.

11. The method of claim 1, wherein said gating means comprises a material which is at least partially permeable to molten matrix metal under the infiltration conditions.

12. The method of claim 11, wherein said gating means comprises porous material containing three-dimensionally interconnected porosity.

13. The method of claim 12, wherein said porous material is made by applying to at least one of said matrix metal and said permeable mass a precursor to the porous material, said applying occurring by at least one process selected from the group consisting of spraying, painting, silk screening and dipping.

14. The method of claim 13, wherein said precursor to the porous material comprises a colloidal graphite material suspended in a liquid medium comprising ethanol.

15. The method of claim 13, wherein said precursor to the porous material comprises an aluminum oxide particulate.

16. A method for making a metal matrix composite, comprising:

provshaing a permeable mass comprising a filler or a preform;

providing a source of molten matrix metal;

applying a gating means comprising a porous material to at least one surface of said permeable mass, thereby defining at least one interface between said source of molten matrix metal and said permeable mass;

infiltrating a portion of said molten matrix metal into at least a portion of said permeable mass through said gating means to form an at least partially infiltrated mass, thereby maintaining a residual, uninfiltrated portion of said source of molten matrix metal;

cooling sufficiently to solidify at least said residual source of molten matrix metal to form a carcass of matrix metal; and separating said carcass of matrix metal from said at least partially infiltrated mass proximate to said at least one interface.

17. The method of claim 16, further comprising locating a separation facilitator adjacent to said gating means.

18. The method of claim 16, wherein said porous material comprises at least one material selected from the group consisting of colloidal graphite and alumina particulate.

19. A method for making a metal matrix composite, comprising:

providing a permeable mass comprising a filler or a preform;

providing a source of matrix metal;

coating said permeable mass with at least one of a porous material and a precursor to a porous material to form a gating means;

orienting said permeable mass so as to position said gating means between said source of matrix metal and said permeable mass;

rendering said source of matrix metal molten; and infiltrating at least a portion of said molten matrix metal into at least a portion of said permeable mass through said gating means.

20. The method of claim 19, wherein said gating means is provided by coating said permeable mass with said precursor to a porous material; and thereafter causing said precursor to form said porous material.

21. The method of claim 20, wherein at least some infiltration enhancer precursor is provided between said porous material and said molten source of matrix metal.

22. The method of claim 20, wherein infiltration enhancer is located in at least a portion of said porous material and said permeable mass.

23. The method of claim 20, wherein said porous material has a fracture strength which is less than the fracture strength of the formed metal matrix composite body.

24. The method of claim 20, wherein said porous material is modified by a reaction of at least a portion of said porous material with at least one of the matrix metal, an infiltrating atmosphere, an infiltration enhancer precursor and an infiltration enhancer.

25. The method of claim 20, wherein said precursor to a porous material comprises a suspension of a solid component in a liquid medium, said solid component comprising at least one material selected from the group consisting of a colloidal graphite material and an aluminum oxide particulate.

26. The method of claim 25, wherein said causing comprises removing said liquid medium front said solid component.

* * * * *